(12) United States Patent
Tan

(10) Patent No.: US 8,335,993 B1
(45) Date of Patent: Dec. 18, 2012

(54) ENHANCED TOUCH SENSITIVE INTERFACE AND METHODS AND SOFTWARE FOR MAKING AND USING THE SAME

(75) Inventor: Kien Beng Tan, Singapore (SG)

(73) Assignee: Marvell International Ltd., Hamilton (BM)

( * ) Notice: Subject to any disclaimer, the term of this patent is extended or adjusted under 35 U.S.C. 154(b) by 448 days.

(21) Appl. No.: 12/579,987

(22) Filed: Oct. 15, 2009

Related U.S. Application Data

(60) Provisional application No. 61/108,279, filed on Oct. 24, 2008.

(51) Int. Cl.
*G06F 3/048* (2006.01)

(52) U.S. Cl. ........ 715/773; 715/835; 715/837; 715/841; 715/863

(58) Field of Classification Search .................. 715/773, 715/835, 837, 841, 863
See application file for complete search history.

(56) References Cited

U.S. PATENT DOCUMENTS

| | | | | |
|---|---|---|---|---|
| 5,685,001 | A * | 11/1997 | Capson et al. | 715/212 |
| 6,812,940 | B2 * | 11/2004 | Arnold | 715/817 |
| 2006/0053387 | A1 * | 3/2006 | Ording | 715/773 |

* cited by examiner

*Primary Examiner* — Andrey Belousov

(57) ABSTRACT

Interfaces, circuits, architectures, devices, systems and methods for displaying, controlling, using and/or designing a virtual keyboard are disclosed. The interface generally includes a touch sensitive display having a virtual keyboard area and a viewing area. The virtual keyboard area includes a plurality of the virtual buttons. Prior to selection of a virtual button, each of the virtual buttons has a first appearance and includes a plurality of alphanumeric, graphical, and/or iconic characters. The interface further includes logic configured to receive an input from the touch sensitive display in response to a virtual button being selected, and send an output to instruct the touch sensitive display to display a second appearance of the selected virtual button. The circuits, architectures, devices, systems, and methods generally include those that embody and/or implement one or more of the inventive concepts disclosed herein.

14 Claims, 17 Drawing Sheets

FIG. 1A
(Related Art)
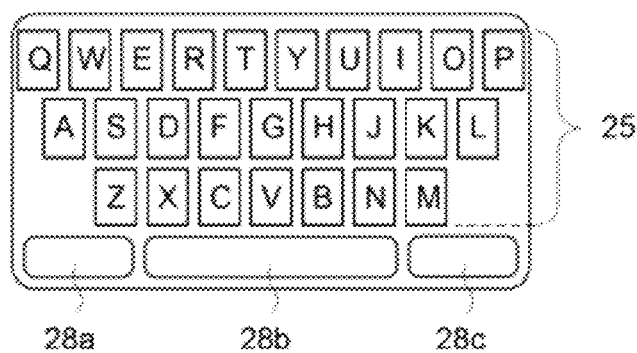
FIG. 1B
(Related Art)
FIG. 1C
(Related Art)
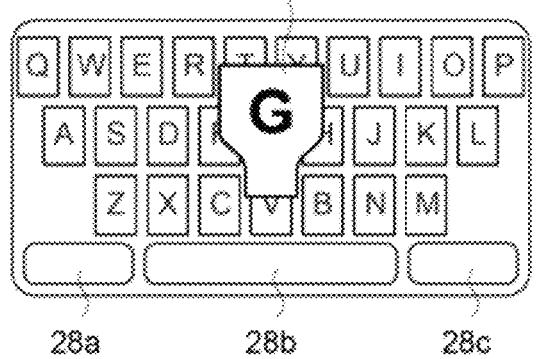

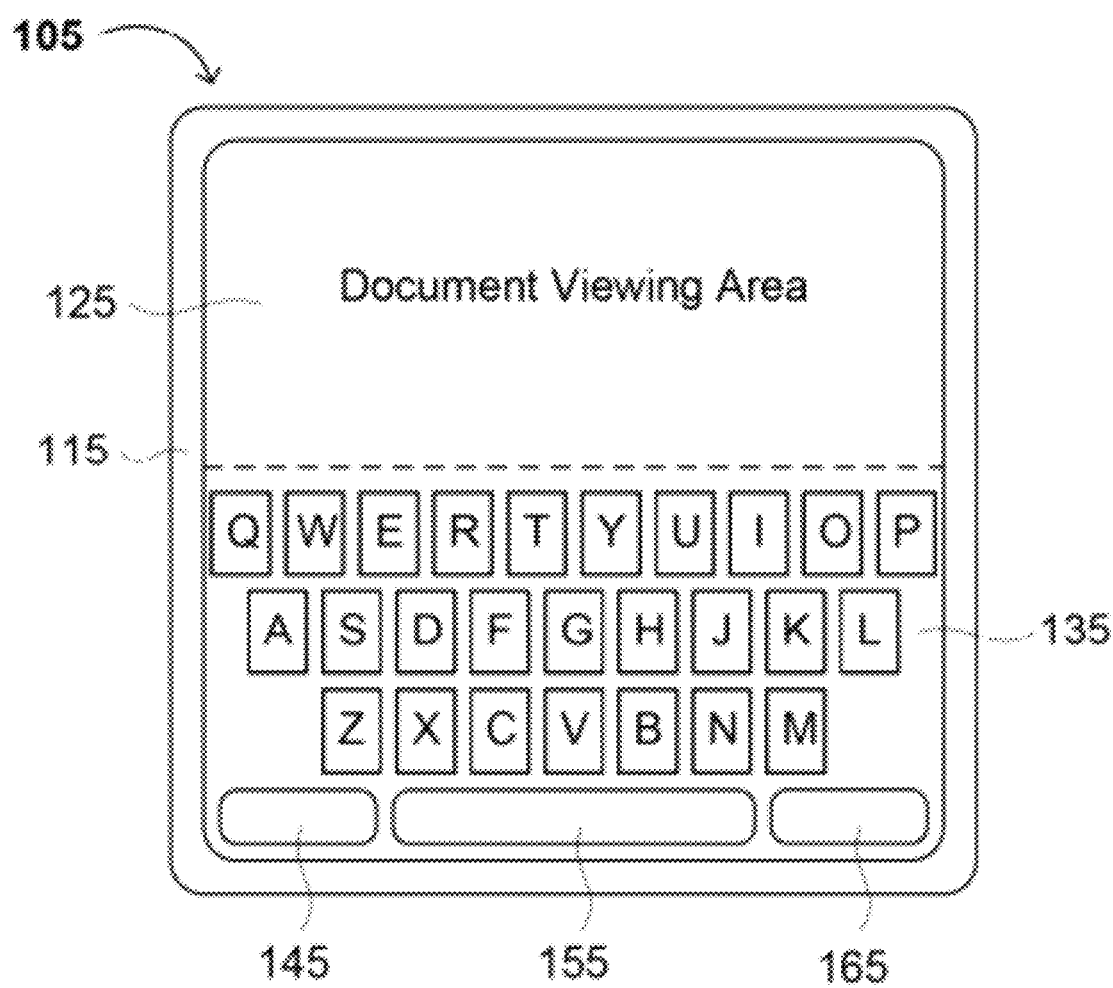

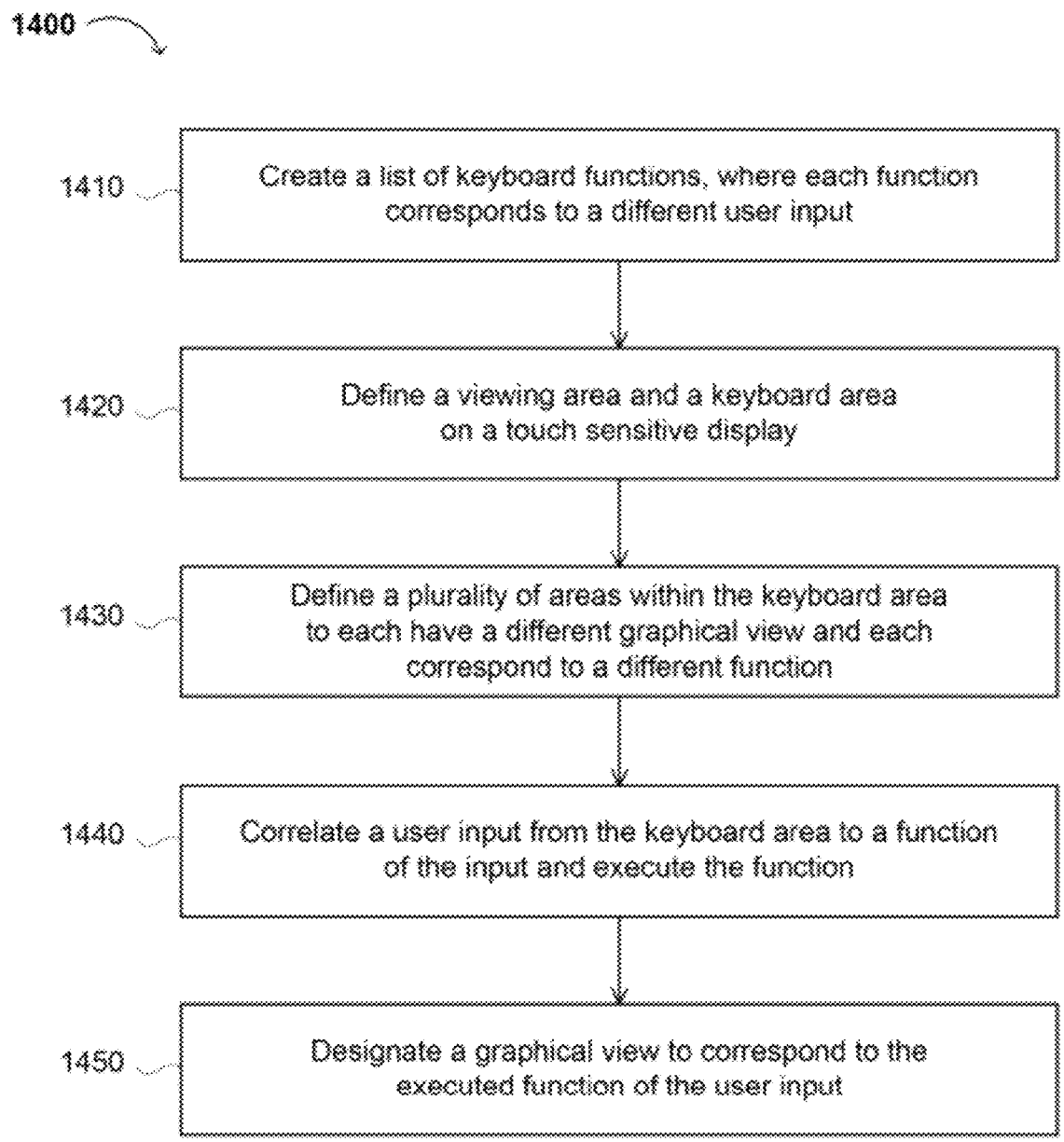

ENHANCED TOUCH SENSITIVE INTERFACE AND METHODS AND SOFTWARE FOR MAKING AND USING THE SAME

RELATED APPLICATIONS

This application claims the benefit of U.S. Provisional Application No. 61/108,279, filed Oct. 24, 2008, incorporated herein by reference in its entirety.

FIELD OF THE INVENTION

The present disclosure generally relates to the field of touch sensitive electronic devices. More specifically, embodiments of the present disclosure pertain to touch sensitive interfaces including a virtual keyboard, devices comprising such touch sensitive interfaces, methods of making and using devices including such touch sensitive interfaces, and algorithms and software for making and using such touch sensitive interfaces and devices including the same.

BACKGROUND

The display area on a touch sensitive display should be allocated efficiently to allow a user to operate an interface of a touch sensitive device in an intuitive and speedy manner, while at the same time, maximizing use of the available display area for the functions needed by the user. For example, a document viewing area needs to be large enough to see characters, while borders which serve no functional purpose may be removed.

Virtual keyboards can be utilized within an interface having a touch sensitive display (for example, a portable electronic device). Conventionally, a smallest usable size of a virtual keyboard is limited to an area sufficient for containing a particular set of virtual keys, where each of the virtual keys has a smallest usable size that allows a user to both accurately and precisely select a particular virtual key. For example, a virtual QWERTY keyboard having a separate virtual key for each character (e.g., the conventional QWERTY keyboard layout of FIG. 1A) generally occupies about 30 times the minimum area of the virtual key since each key must be a minimum size to be usable. More typically, as shown in FIG. 1B, some space is allocated between virtual keys 25 in a conventional virtual QWERTY keyboard 20, and additional area is allocated for other (e.g., functional) virtual keys 28a-28c.

Certain conventional virtual keyboards include first and second appearances of virtual keys corresponding to different appearances of the keys before and after making a key selection, respectively, by touching the virtual keyboard within a predetermined key area. A first touch selects a virtual key, and then a second appearance is displayed. For example, FIG. 1C shows the conventional virtual keyboard 20 containing a selected virtual key having a second appearance 35 representing the letter "G." A conventional second appearance frequently shows a larger and/or otherwise emphasized virtual button containing the same character as in the first appearance. The second appearance 35 allows a user to see the selected virtual key more precisely or easily, while their finger is still touching the device. A final selection is made when the user's finger is removed from the touch sensitive display. However, if a user touches a virtual button and thus initiates a second appearance of the virtual button, the user has the option to move their finger to another virtual button while still touching the touch sensitive display. This allows a user to correct an incorrect selection.

A conventional virtual key can have dimensions of about 4×6 mm, and a conventional virtual keyboard can typically occupy up to about 35-40% (and in some cases up to almost 50%) of the entire touch sensitive display area. For example, FIG. 1D shows a conventional device 100 having a touch sensitive display 110, viewing area 120, virtual keyboard 130, and other virtual keys 140, 150, and 160, in which the virtual keyboard 130 consumes about 35% of the touch sensitive display 110. FIG. 1E shows a conventional device 105 that includes a touch sensitive display 115, viewing area 125, virtual keyboard 135, and other virtual keys 145, 155, and 165. The device 105 has a smaller height-to-width ratio (i.e., aspect ratio) than the device 100 of FIG. 1D, and as a result, the virtual keyboard 135 of device 105 consumes almost 50% of the touch sensitive display 115. Since an average person is more easily able to touch a virtual key of about 1×1 cm with high accuracy and precision, conventional virtual keys can be difficult to accurately and precisely select. Also, dedicating valuable display area to a virtual keyboard can reduce the proportion of display area available for other functions, such as displaying a document or map.

This "Discussion of the Background" section is provided for background information only. The statements in this "Discussion of the Background" are not an admission that the subject matter disclosed in this "Discussion of the Background" section constitutes prior art to the present disclosure, and no part of this "Discussion of the Background" section may be used as an admission that any part of this application, including this "Discussion of the Background" section, constitutes prior art to the present disclosure.

SUMMARY

Embodiments of the present disclosure relate to circuitry, architectures, systems, methods, algorithms and software for displaying alphanumeric, graphical, and/or iconic characters in a virtual keyboard on a touch sensitive display, modifying or changing the appearance of the virtual keyboard in response to a defined area being selected, and selecting one or more such characters using the virtual keyboard.

The circuitry generally comprises a first processor, configured to receive a first input from a virtual keyboard of a touch sensitive display identifying a group of alphanumeric, iconic and/or graphical characters or a first location on the virtual keyboard corresponding to the group of alphanumeric, iconic and/or graphical characters. and a second input identifying one character of the group of alphanumeric, iconic and/or graphical characters or a second location corresponding to the one character of the group of alphanumeric, iconic and/or graphical characters, the first processor being further configured to retrieve first information regarding a modified appearance of the group of alphanumeric, iconic and/or graphical characters based on the first input from the virtual keyboard and retrieve second information regarding the one character based on the second input from the virtual keyboard; a second processor, configured to receive the first and second information from the first processor, provide modified appearance display information to the virtual keyboard based on the first information from the first processor, and provide graphic display information to a viewing area of the touch sensitive display based on the second information from the first processor; and one or more memories configured to store the first and second information the modified appearance display information, and the graphic display information. The architectures and/or systems generally comprise those that include a circuit embodying one or more of the inventive concepts disclosed herein.

The method of selecting an alphanumeric, graphical, and/or iconic character in a virtual keyboard on a touch sensitive display generally comprises using a stimulus appropriate for the touch sensitive display, selecting a first defined area of the virtual keyboard, the virtual keyboard comprising a plurality of defined areas, wherein each defined area has a first appearance and comprises a group of alphanumeric, iconic and/or graphical characters, and a processor instructs the touch sensitive display to display a second appearance of the group of alphanumeric, iconic and/or graphical characters in the first defined area in which each of the characters in the group is enlarged; and selecting one of the alphanumeric, iconic and/or graphical characters in the second appearance of the group.

A method of modifying a touch sensitive display, the touch sensitive display comprising a plurality of defined areas, wherein each defined area has a first appearance and comprises a group of alphanumeric, iconic and/or graphical characters, the method generally comprising: displaying the first appearance of the plurality of defined areas on the touch sensitive display; sending an input signal to a processor when a first defined area is selected, the input signal identifying the first defined area; and instructing the display to change or modify the first appearance of the first defined area to a second appearance, wherein the second appearance enlarges the alphanumeric, iconic, and/or graphical characters in the group of alphanumeric, iconic and/or graphical characters in the first defined area.

The present disclosure provides a touch sensitive display and/or interface having a virtual keyboard containing virtual buttons and/or virtual keys, wherein the virtual keyboard occupies less area of the touch sensitive display than conventional virtual keyboards, and the virtual keys occupy a larger area of the touch sensitive display than conventional virtual keys. By implementing such advantages, the ability to select a desired key is improved, and the proportion of display areas other than the virtual keyboard is increased. Such an increased area can be used to view a larger document, map or portion thereof, or to allocate a larger area to one or more other functions of the touch sensitive display.

These and other potential advantages of the present disclosure will become readily apparent from the detailed description of various embodiments below.

BRIEF DESCRIPTION OF THE DRAWINGS

FIG. 1A is a diagram showing a conventional QWERTY keyboard layout.

FIG. 1B is a diagram showing a conventional virtual keyboard.

FIG. 1C is a diagram showing a selected virtual key of the conventional virtual keyboard of FIG. 1B.

FIG. 1E is a diagram showing an interface in a reduced size touch sensitive display having a conventional virtual keyboard.

FIG. 14 is a flow chart showing a method of designing the present touch sensitive display interface.

DETAILED DESCRIPTION

Figure 1D:
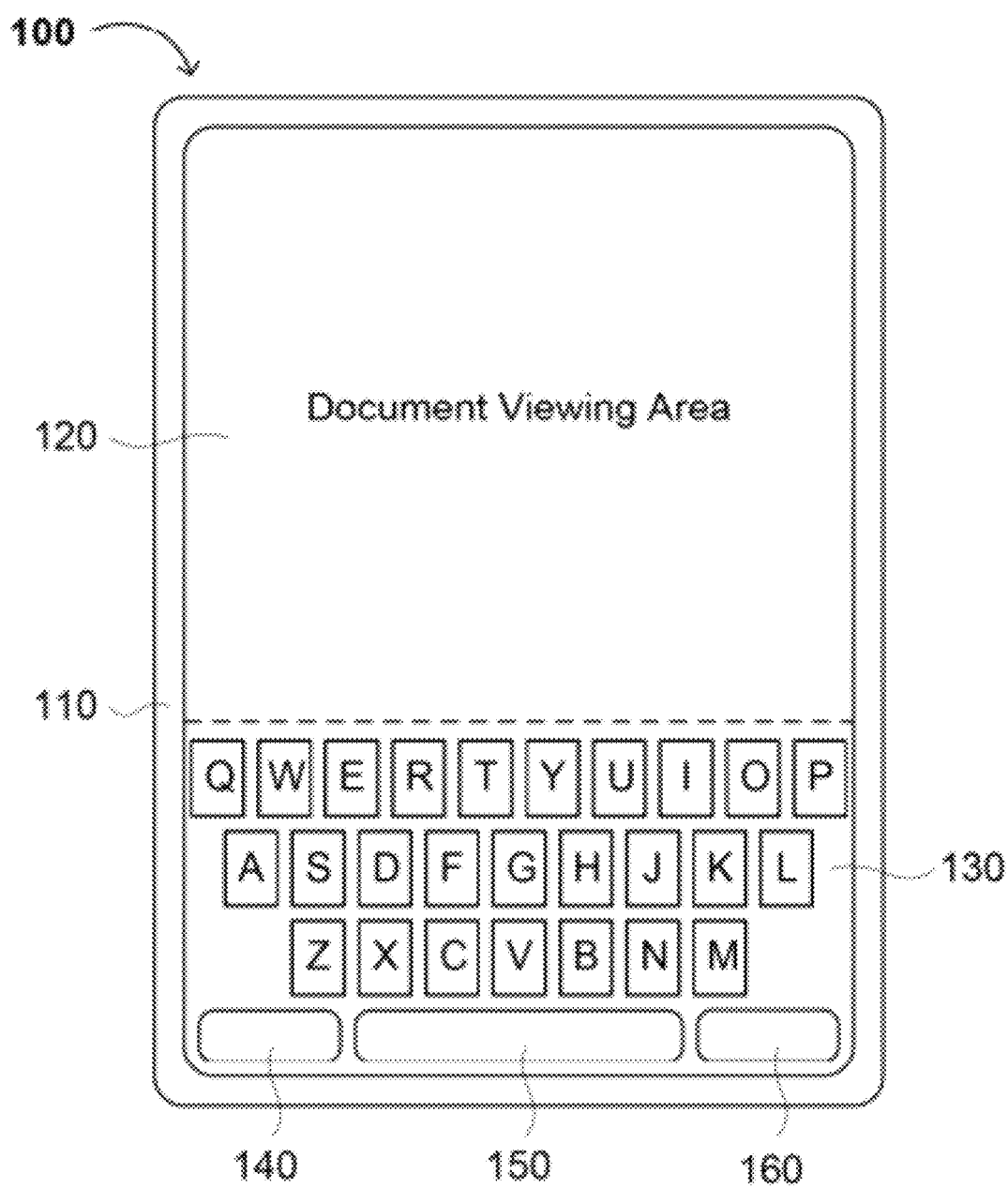
FIG. 1D is a diagram showing an interface of a touch sensitive display having a conventional virtual keyboard.

Reference will now be made in detail to various embodiments of the invention, examples of which are illustrated in the accompanying drawings. While the invention will be described in conjunction with the embodiments provided below, the embodiments are not intended to limit the invention. On the contrary, the invention is intended to cover alternatives, modifications and equivalents that may be included within the scope of the invention as defined by the appended claims. Furthermore, in the following detailed description, numerous specific details are set forth in order to provide a thorough understanding of the present disclosure. However, the present invention may be practiced without these specific details. In other instances, well-known methods, procedures, components, and circuits have not been described in detail so as not to unnecessarily obscure aspects of the present invention.

Some portions of the detailed descriptions which follow are presented in terms of processes, procedures, logic blocks, functional blocks, processing, and other symbolic representations of operations on data bits, data streams or waveforms within a computer, processor, controller and/or memory. These descriptions and representations are generally used by those skilled in the data processing arts to effectively convey the substance of their work to others skilled in the art. A process, procedure, algorithm, function, operation, etc., is herein, and is generally, considered to be a self-consistent sequence of steps or instructions leading to a desired and/or expected result. The steps generally include physical manipulations of physical quantities. Usually, though not necessarily, these quantities take the form of electrical, magnetic, optical, or quantum signals capable of being stored, transferred, combined, compared, and otherwise manipulated in a computer, data processing system, or logic circuit. It has proven convenient at times, principally for reasons of common usage, to refer to these signals as bits, waves, waveforms, streams, values, elements, symbols, characters, terms, numbers, or the like.

All of these and similar terms are associated with the appropriate physical quantities and are merely convenient labels applied to these quantities. Unless specifically stated otherwise and/or as is apparent from the following discussions, it is appreciated that throughout the present application, discussions utilizing terms such as "processing," "operating," "computing," "calculating," "determining," "manipulating," "transforming," "displaying" or the like, refer to the action and processes of a computer, data processing system, logic circuit or similar processing device (e.g., an electrical, optical, or quantum computing or processing device) that manipulates and transforms data represented as physical (e.g., electronic) quantities. The terms refer to actions, operations and/or processes of the processing devices that manipulate or transform physical quantities within the component(s) of a system or architecture (e.g., registers, memories, other such information storage, transmission or display devices, etc.) into other data similarly represented as physical quantities within other components of the same or a different system or architecture.

Furthermore, for the sake of convenience and simplicity, the terms "data," "data stream," "waveform" and "information" may be used interchangeably, as may the terms "connected to," "coupled with," "coupled to," and "in communication with" (which terms also refer to direct and/or indirect relationships between the connected, coupled and/or communication elements unless the context of the term's use unambiguously indicates otherwise), but these terms are also generally given their art-recognized meanings.

The present disclosure concerns a user interface, circuits, architectures, and software for a keyboard in a touch sensitive display, or virtual keyboard, as well as methods of designing, making and using the same. The user interface includes a virtual keyboard occupying less area on the touch sensitive display than conventional virtual keyboards, and situated such that each virtual button within the virtual keyboard occupies a greater area on the touch sensitive display than conventional virtual buttons. This is accomplished by having multiple characters represented by a single virtual button having a first appearance, then in response to selecting a virtual button, the characters (or virtual keys) in the group of characters on the virtual button assume a second, larger appearance. In this manner, the present virtual keyboard thus provides the benefits of larger virtual buttons and a smaller keyboard area. When the size of a virtual button is increased, selecting a particular virtual button with a lower probability of error is possible, and character input speed is increased. When a virtual keyboard size is reduced, there is more area on the display for other portions of the interface, such as a document or map viewing area.

The disclosure, in its various aspects, will be explained in greater detail below with regard to various embodiments.

A First Virtual Keyboard

Figure 2A:
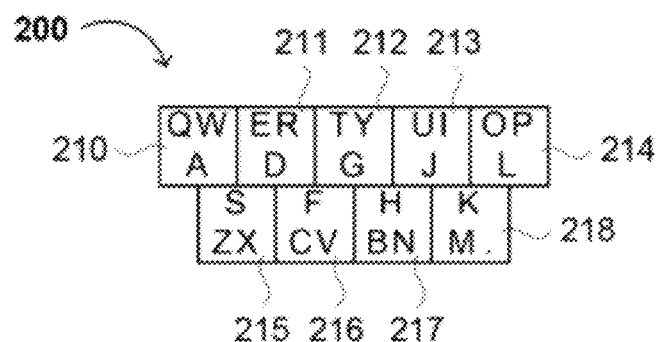
FIG. 2A is a diagram showing a first embodiment of a virtual keyboard layout.

FIG. 2A shows a virtual keyboard 200 containing virtual keys 210-218, each of which represents a plurality of alphanumeric, iconic and/or graphical characters. The virtual keyboard 200 can be included in an interface for a touch sensitive display. The interface can include a touch screen display and any electronic display known in the art, such as a plasma display panel (PDP), liquid crystal display (LCD), light emitting diode display (LED), organic light emitting diode display (OLED), surface-conduction electron-emitter display (SED), laser display, carbon nanotube display, or nanocrystal display operably coupled to a touch sensitive component or sensor layer configured to receive user inputs via contact from a finger, stylus, or other touching device. The touch sensitive display can receive user inputs, provide user manipulated output data, and/or receive one or more display signals. The virtual keyboard 200 is configured to display a first appearance of the virtual buttons. The first appearance of a virtual button generally contains a visual representation of the characters corresponding to or represented by that virtual button. Further, the second appearance can be displayed automatically when the first appearance of the virtual button is touched.

The plurality of alphanumeric, iconic and/or graphical characters are arranged in groups such that more than one character is displayed within a first appearance of a virtual button 210. The virtual button 210 can have a border for visually defining the perimeter of the virtual button 210, and can be defined as particular polygonal or elliptical shape. Furthermore, the virtual buttons 210-218 and characters contained within such virtual buttons can be grouped in a manner similar to that of a QWERTY keyboard, although other arrangements (e.g., sequential; i.e., a, b, c, d, e . . . ) are possible.

Although the first and second appearances of a virtual key generally have the same characters, the second appearance of the virtual key can comprise a different shape, color, and/or font. Also, each virtual button can be defined as a geometric area, group of pixels, output signals, or shape defined by a group of coordinates of the touch sensitive display.

The plurality of alphanumeric, iconic, and/or graphical characters can comprise any combination of characters including letters, numbers, punctuation marks, accents and/or mathematical or iconic symbols. The letters can be of any alphabet or language such as Roman (English), Greek, Cyrillic (Russian), Hebrew, Hindi, Arabic, etc. Punctuation marks can include a period, a comma, a semicolon, explanation point, ampersand, asterisk, etc. Accents can be included in one or more virtual buttons and added to letters from the Roman alphabet using, for example, an "overstrike" function (which can be included in a function key such as any of virtual buttons 532, 534, and 536; see FIG. 5). Mathematical symbols can include a plus sign (+), a minus sign (−), an "equals to" symbol (=), greater than sign (>), less than sign (<), integral symbol (∫), summation symbol (Σ), infinity symbol (∞), square root symbol (√), etc. Iconic symbols can include emoticons, registered or unregistered trademark or copyright symbols, or any other iconic symbol. Alphanumeric characters can also include parts of (or entire) symbols or characters in Asian languages such as Chinese, Japanese or Korean. Other characters or symbols such as currency symbols ("$", "¥", "£", etc.) can be included in some embodiments. Computer languages such as PERL, C, C++, HTML, etc. can also be included.

Any number of characters of at least two can be represented by a virtual button, although a practical limit may be reached within constraints of the particular device that includes the virtual keyboard. For example, a virtual button can include 2, 3, 4, 5, 6 or more characters. Also, one virtual button can represent a plurality of letters (e.g., Q, W, and A), and another virtual button can represent a plurality of mathematical functions (e.g., +, −, and =). A virtual button can visually display all of the characters it represents, or the virtual button can visually display less than all of the characters that it represents. For example, a virtual button can display "A-D," but represent letters A, B, C, and D. Although the described embodiments discuss a virtual keyboard having buttons organized in an offset pattern for resemblance to a QWERTY keyboard, another layout of the keyboard can be utilized, such as an ordered array of virtual buttons having rows and columns (e.g., an array of x rows by y columns, where x is at least 2, and y is at least 2, 3, or 4 [e.g., 5]; see, e.g., FIG. 9), a cloud assortment where virtual buttons are grouped according to use, or in a manner which allows the virtual keyboard to change (fluidly or otherwise) based on input.

Figure 2B:
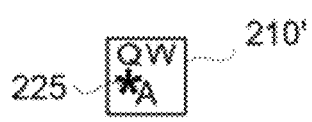
FIG. 2B is a diagram showing an embodiment of a first appearance of a virtual button.
Figure 2C:
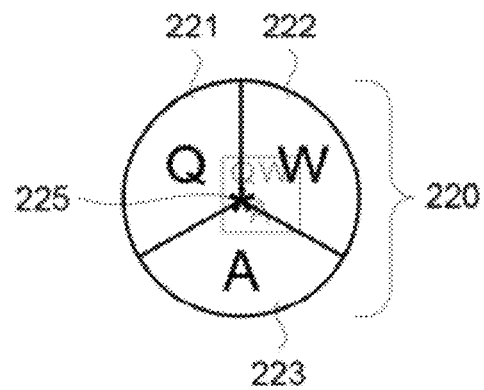
FIG. 2C is a diagram showing an embodiment of a second appearance of the virtual button of FIG. 2B.

Referring now to FIGS. 2B-2C, a selected virtual button 210*(FIG. 2B) generally causes a second appearance 220 (FIG. 2C) of the virtual button to be displayed. The second appearance 220 of a selected virtual button contains the same characters as the first appearance 210* of the button (FIG. 2B), in an enlarged or otherwise emphasized manner relative to the first appearance 210* and/or relative to non-selected virtual buttons 211-218 within the virtual keyboard 200 (FIG. 2A). In addition, and referring now to FIG. 2C, each character in the second appearance 220 of the selected virtual button can be represented by a virtual key 221, 222 or 223. In some embodiments, the second appearance 220 can be centered at the point (denoted by an asterisk 225) where the user touched the first appearance 210*(FIG. 2B) of the virtual button. The second appearance 220 (FIG. 2C) can be displayed on the virtual keyboard as a pop-up of the first appearance 210* (FIG. 2B) of the corresponding virtual button.

Figure 2D:
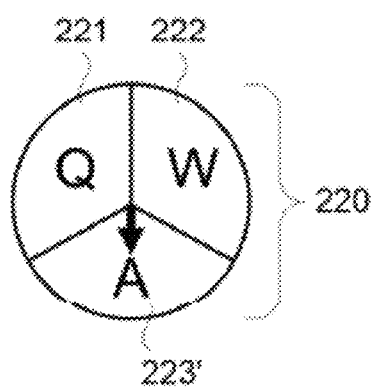
FIGS. 2D-2E are diagrams showing different character selection operations using the second appearance of the virtual button of FIG. 2B.
Figure 2E:
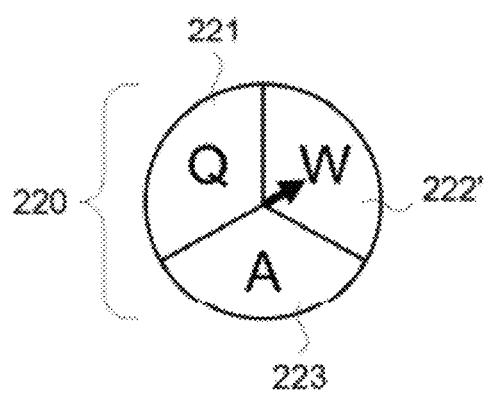

FIGS. 2D-2E show second appearances of a virtual button. The arrows shown in FIGS. 2D-2E denote an appropriate touching motion, such as a swipe or picking up a touching instrument and placing it on the touch sensitive display at the end of the arrow, by a user intending to select the character in the direction of the arrow. For example, after a popup such as 222a appears, a user moves the touching instrument from the center of the popup along the arrow shown in FIG. 2D (e.g., away from the center), and then releases the touching instrument from the touch sensitive display to select "A." A user is also able to move the touching instrument from the center of the popup along the arrow shown in FIG. 2E (e.g. away from the center), and then release the touching instrument from the touch sensitive display to select "W." Alternatively, simply moving the touching instrument to one of the virtual keys 221, 222 or 223 can select the character on that key.

In further embodiments, selecting a character on a virtual key (e.g., 221, 222, and 223) can cause a computer operation to be executed. For example, selecting a particular character can input that particular character into a document, open an executable program file, run a script or macro, automatically run particular command lines, initiate a setup, or perform any other function corresponding to selection of that character. Other functions and/or computer operations can be executed upon selection of a sequence or combination of multiple virtual keys (or one or more keys and one or more virtual buttons such as buttons 532, 534 or 536 in FIG. 5A).

A Second Virtual Keyboard

Figure 3A:
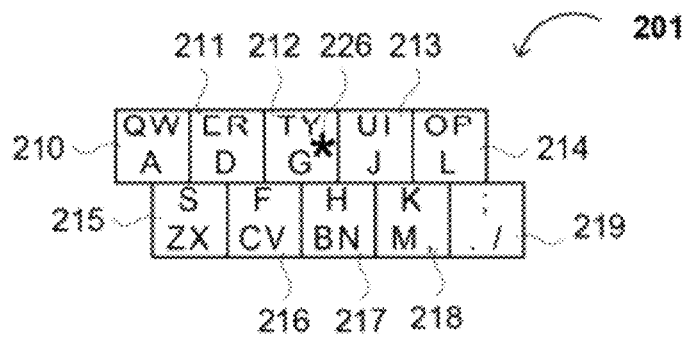
FIG. 3A is a diagram showing a second embodiment of a virtual keyboard.
Figure 3B:
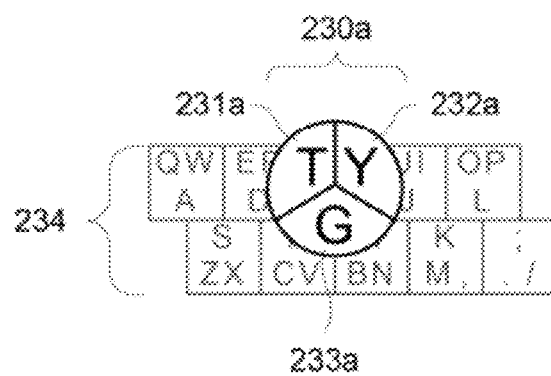
FIGS. 3B-3D are diagrams showing various embodiments of a second appearance of a virtual button on the virtual keyboard of FIG. 3A.

FIG. 3A shows a second embodiment of a virtual keyboard 201, which is essentially the virtual keyboard 200 of FIG. 2A, further including a tenth virtual button 219 containing 3 common punctuation marks ";", "." and "/". Virtual button 212 is selected, as designated by the asterisk 226. In response, and as shown in FIG. 3B, a second appearance 230a of the selected virtual button 212 appears as an enlarged representation of selected virtual button 212.

Figure 3C:
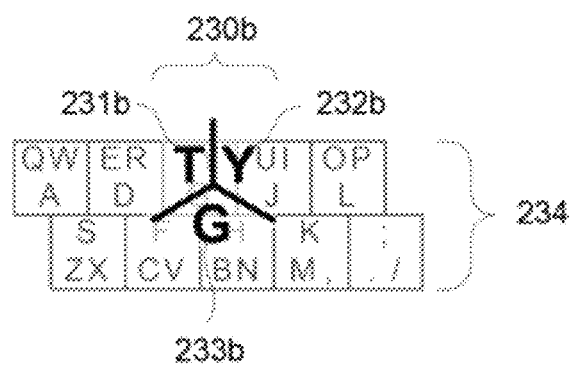
Figure 3D:
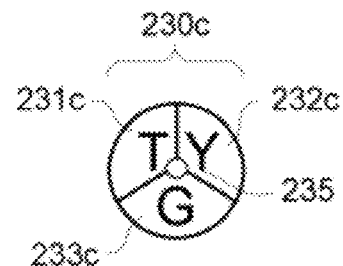

Each character included in the selected virtual button 212 is displayed in a designated area of the second appearance 230a (a "virtual key"), for example areas 231a, 232a and 233a, such that a user can select any one of the characters by selecting an area containing a desired character via an appropriate user input. An appropriate user input for selecting a virtual key 231a, 232a or 233a containing a character from the second appearance 230a can include but is not limited to a swipe or point selecting motion using any of the touching methods discussed above. Each virtual key 231a, 232a or 233a containing a character can have any shape the touch sensitive display is able to display, including a "borderless" shape 230b (FIG. 3C) or a hollow center pie shape 230c (FIG. 3D). The "borderless" shape 230b of FIG. 3C containing virtual keys 231b, 232b and 233b includes virtual (but not visible) borders defined by software and/or firmware data and/or instructions (see, e.g., the "Software" discussion below). Thus, the virtual keys 231b-233b in the second appearance 230b may not have a visible border, and each of the virtual keys 231b-233b can extend to any area of the touch sensitive display within an area defined by virtual lines extending from the visible lines in the second appearance 230b to the outer border of the touch sensitive display.

As shown in FIG. 3D, in a further embodiment, the center (or other predetermined area) of a second appearance 230c of a virtual button can have a hollow area 235, and touching that area 235 results in no change to the current state of the touch sensitive display. The hollow area 235 can have a visual appearance or be invisible. In the latter case, the hollow area 235 on the touch sensitive display serves the same function as the visible hollow area 235. Moving a touching instrument outside the hollow area 235 allows a user to select a character. However, if a user removes the touching instrument from the touch sensitive display while touching the hollow area 235 (or picks up the touching instrument then contacts the hollow area 235), no character is input, and the touch sensitive display can return to a state showing the entire virtual keyboard (e.g., keyboard 201 in FIG. 3A) and each virtual button 210-219 in the first appearance.

Figure 3E:
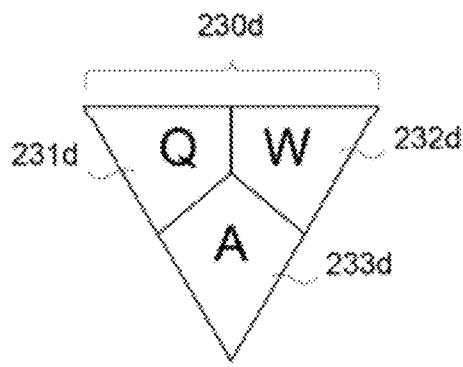
FIGS. 3E-3I show alternative embodiments of a second appearance of a virtual button on the virtual keyboard.
Figure 3F:
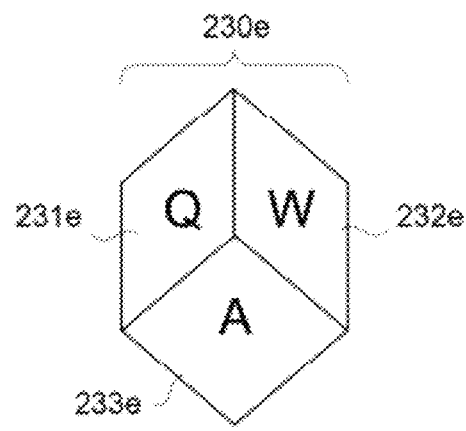
Figure 3G:
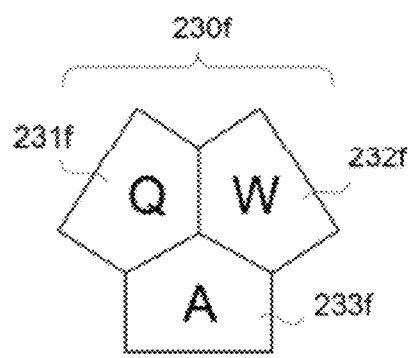
Figure 3H:
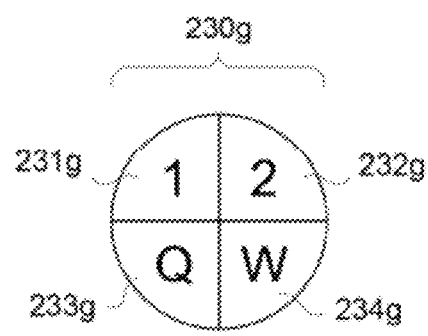
Figure 3I:
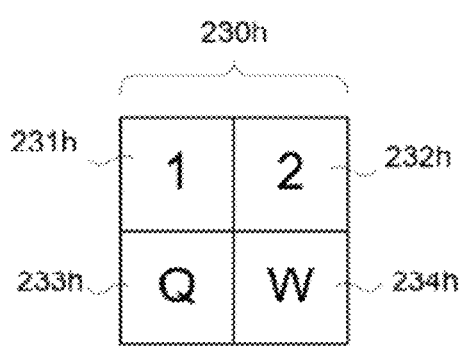

FIG. 3E shows a second appearance of a virtual button 230d having a triangular shape with three virtual keys 231d, 232d and 233d within, each containing a character. FIG. 3F shows a second appearance 230f of a virtual button having a hexagonal shape, with three virtual keys 231e, 232e and 233e within, each containing a character. FIG. 3G shows a second appearance 230g of a virtual button having an irregular nonagonal shape with three virtual keys 231f, 232f and 233f within. Each of the virtual keys 231f, 232f and 233f has a pentagonal shape and contain a character. FIG. 3H shows a second appearance 230g of a virtual button having a circular shape with four virtual keys 231g, 232g and 233g within, each consisting of one-fourth of the second appearance 230g virtual button, and each containing a character. FIG. 3I shows a second appearance of a virtual button having a square shape with four virtual keys 231h, 232h and 233h of equally divided area within, each containing a character. The virtual keys containing characters within a second appearance of a virtual button can be represented by any shape capable of being displayed and/or divided in the touch sensitive display.

A Third Virtual Keyboard

Figure 4A:
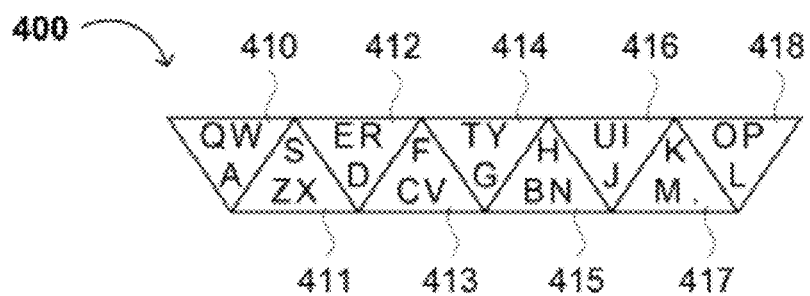
FIG. 4A is a diagram showing a third embodiment of a virtual keyboard.
Figure 4B:
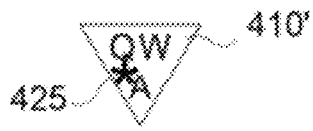
FIG. 4B is a diagram showing an embodiment of a first appearance of a virtual button on the virtual keyboard of FIG. 4A.
Figure 4C:
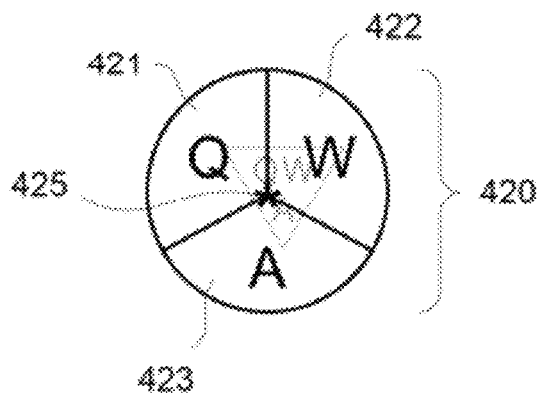
FIG. 4C is a diagram showing an embodiment of a second appearance of the virtual button of FIG. 4B.

Referring now to FIG. 4A, a virtual keyboard 400 has triangle shaped virtual buttons 410-418 configured to resemble a QWERTY keyboard layout. The virtual buttons 410-418 are arranged in a single row, thus allowing the virtual keyboard 400 to occupy a minimal vertical area of a touch sensitive display. Referring to FIG. 4B, touching a first appearance of virtual key 410 (the location of contact being denoted by an asterisk 415), produces a second appearance 420 of the virtual button as shown in FIG. 4C. As shown in a comparison of FIGS. 4B and 4C, the shape of the second appearance 420 is not necessarily the same as the shape of the first appearance of the virtual button 410, although the second appearance 420 is generally larger than the first appearance of the virtual button 410.

A First Touch Sensitive Display

Figure 5A:
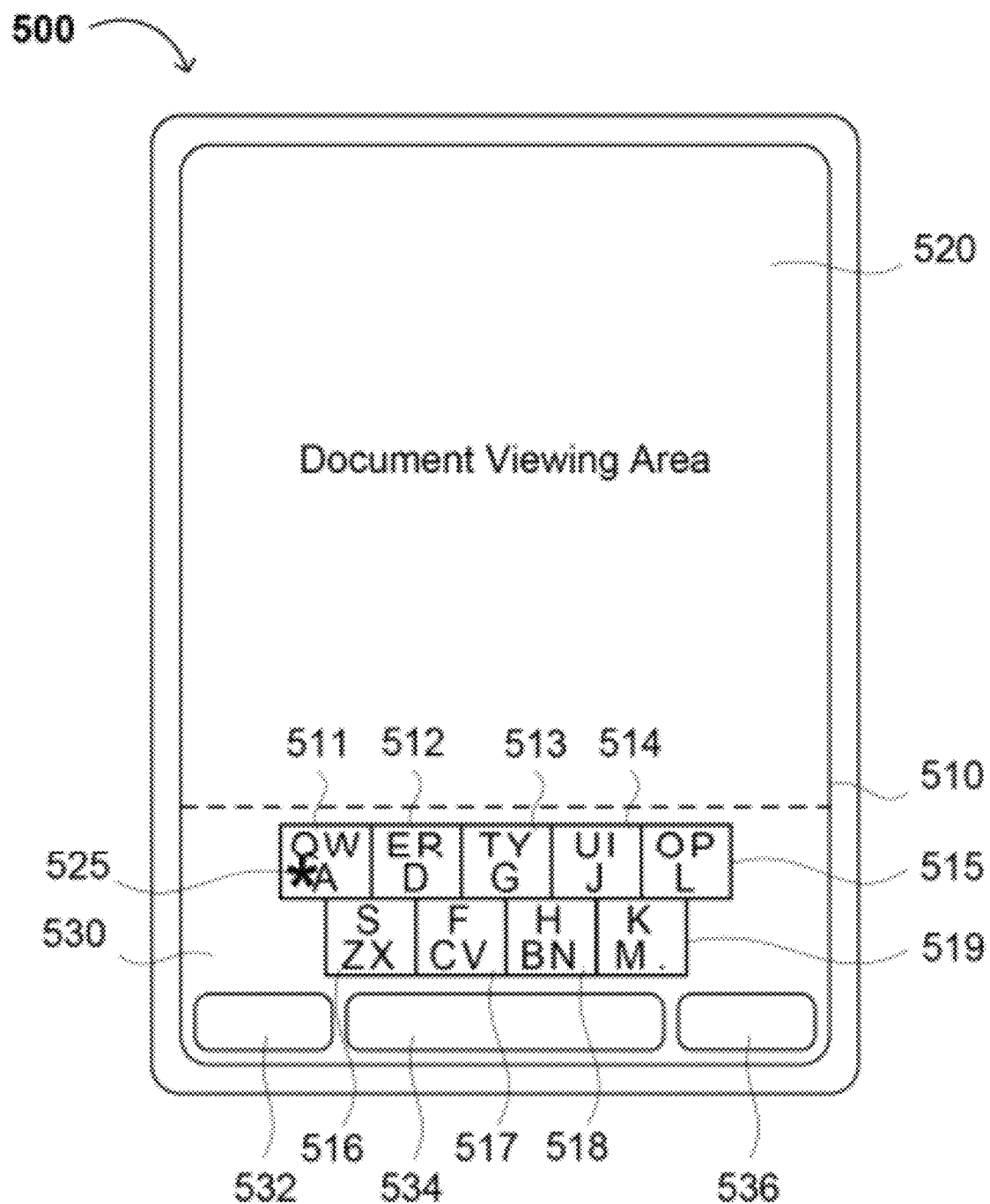
FIG. 5A is a diagram showing an embodiment of an interface for a touch sensitive display including the present virtual keyboard.

FIG. 5A shows a device 500 having a touch sensitive display 510 comprising a viewing area 520 and a virtual keyboard 530. The device 500 can include any portable electronic device, such as a cellular telephone, a personal digital assistant (PDA), a global positioning system (GPS) device, a camera, a camcorder, an electronic gaming device, a remote control device (e.g., transmitter or receiver), a laptop or other portable computer, a satellite radio device, a car stereo receiver or other control system (e.g., climate controller, automotive GPS system, diagnostic system, etc.), a home theatre or other entertainment system interface, or a home stereo system. The viewing area 520 can show any displayable object, such as a document, map, spreadsheet, database entry or database viewing screen, gaming screen, executable application screen, compass, camera view field or camcorder viewfinder screen, one or more photographs, one or more messages, a calendar screen, or any other visual display that the device 500 is capable of displaying. The virtual keyboard 530 has virtual buttons 511-519 as discussed above. The area of the touch sensitive display 510 occupied by virtual keyboard 530 is less than an area occupied by a conventional virtual keyboard on the same touch sensitive display 510, thus allowing for a larger viewing area 520.

Figure 5B:
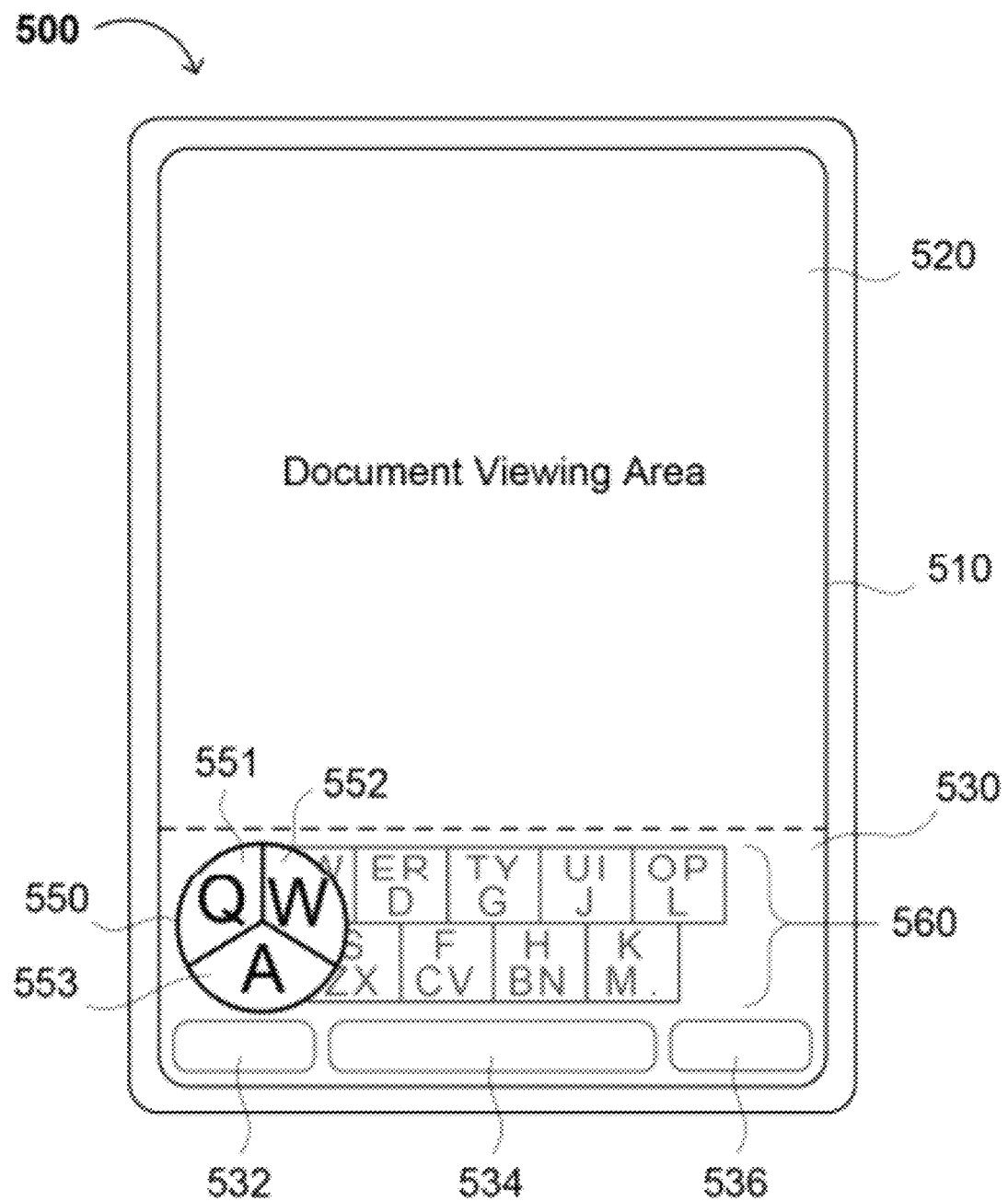
FIG. 5B is a diagram showing the touch sensitive display interface of FIG. 5A, including an embodiment of the second appearance of a selected virtual button.

FIG. 5B shows a second appearance 550 of the selected virtual button 511, denoted by asterisk 511* in FIG. 5A. The second appearance 550 enables easy selection of a desired character due to the larger area assigned to the second appearance 550 for the virtual keys 551, 552 and 553 (each containing a single character) than a conventional virtual key. Virtual keys 532, 534, and 536 can provide and/or represent a space bar and/or any predefined or predetermined function, such as shifting (e.g., capitalization), controlling (e.g., implementing a predetermined keyboard function, such as copying, cutting, pasting, justifying, centering, resizing, italicizing, bolding, underlining, etc.), starting or launching a help window, undoing, redoing, opening, closing, replying, forwarding, sending, spell-checking, saving, or printing. Such predefined or predetermined functions can be initiated or executed by selecting a virtual key 532, 534, or 536 alone or in combination with one or more selected virtual keys or other virtual buttons.

A Second Touch Sensitive Display

Figure 6A:
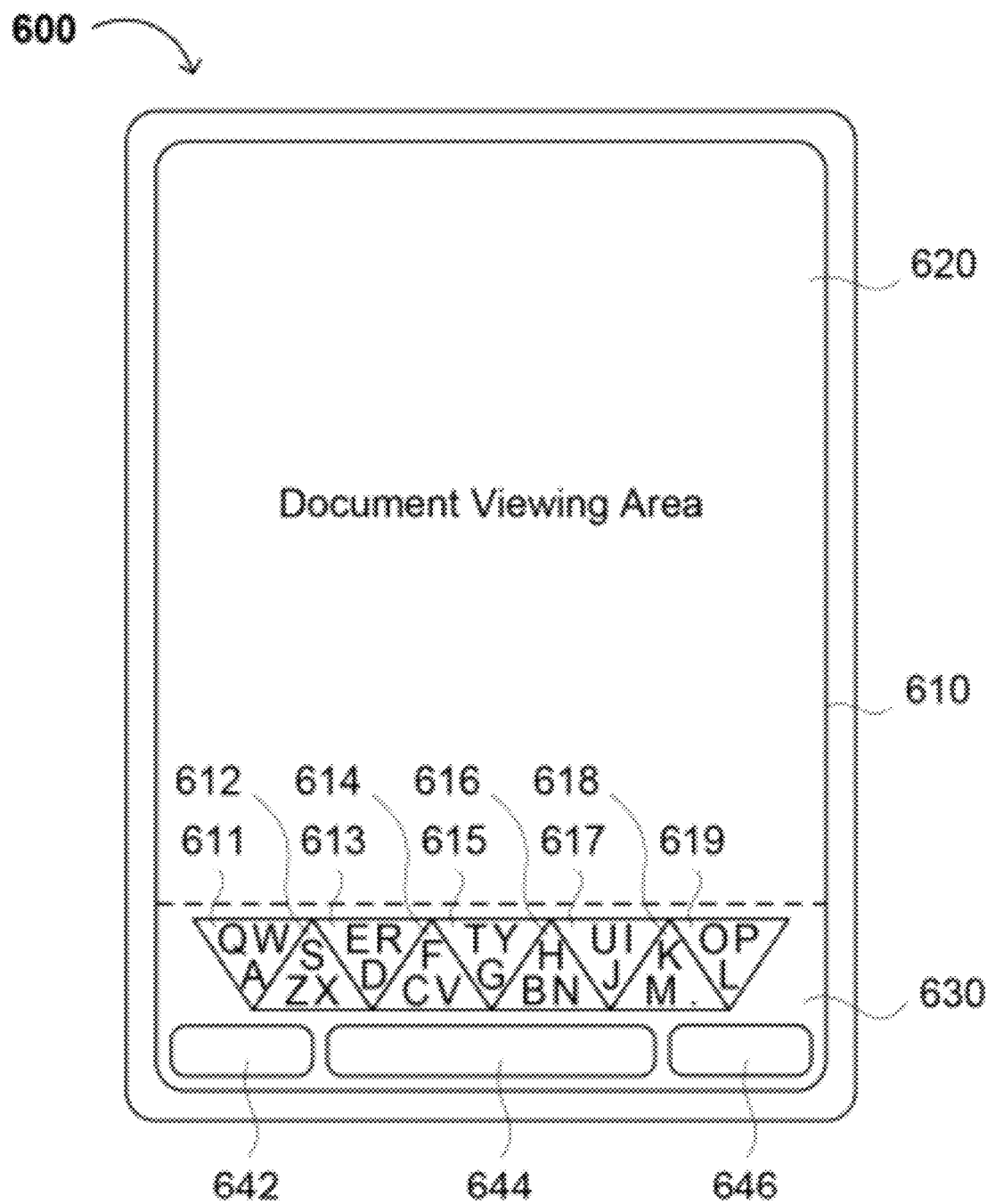
FIG. 6A is a diagram showing a second embodiment of an interface for a touch sensitive display.

FIG. 6A shows a device 600 that has a touch sensitive display 610 comprising a document viewing area 620 and a virtual keyboard 630. The device 600 can include any portable electronic device and the viewing area 620 can show any displayable object, as discussed herein (e.g., with regard to the device 500 and the viewing area 520 of FIG. 5A). The virtual keyboard 630 (FIG. 6A) comprises a row of triangular virtual buttons 611-619, as discussed above with regard to the virtual keyboard 400 of FIG. 4A, and a plurality of virtual keys 642, 644, and 646 providing and/or representing a space bar and/or a predefined or predetermined function, as discussed above with regard to virtual keys 532, 534, and 536 of FIG. 5B.

Figure 6B:
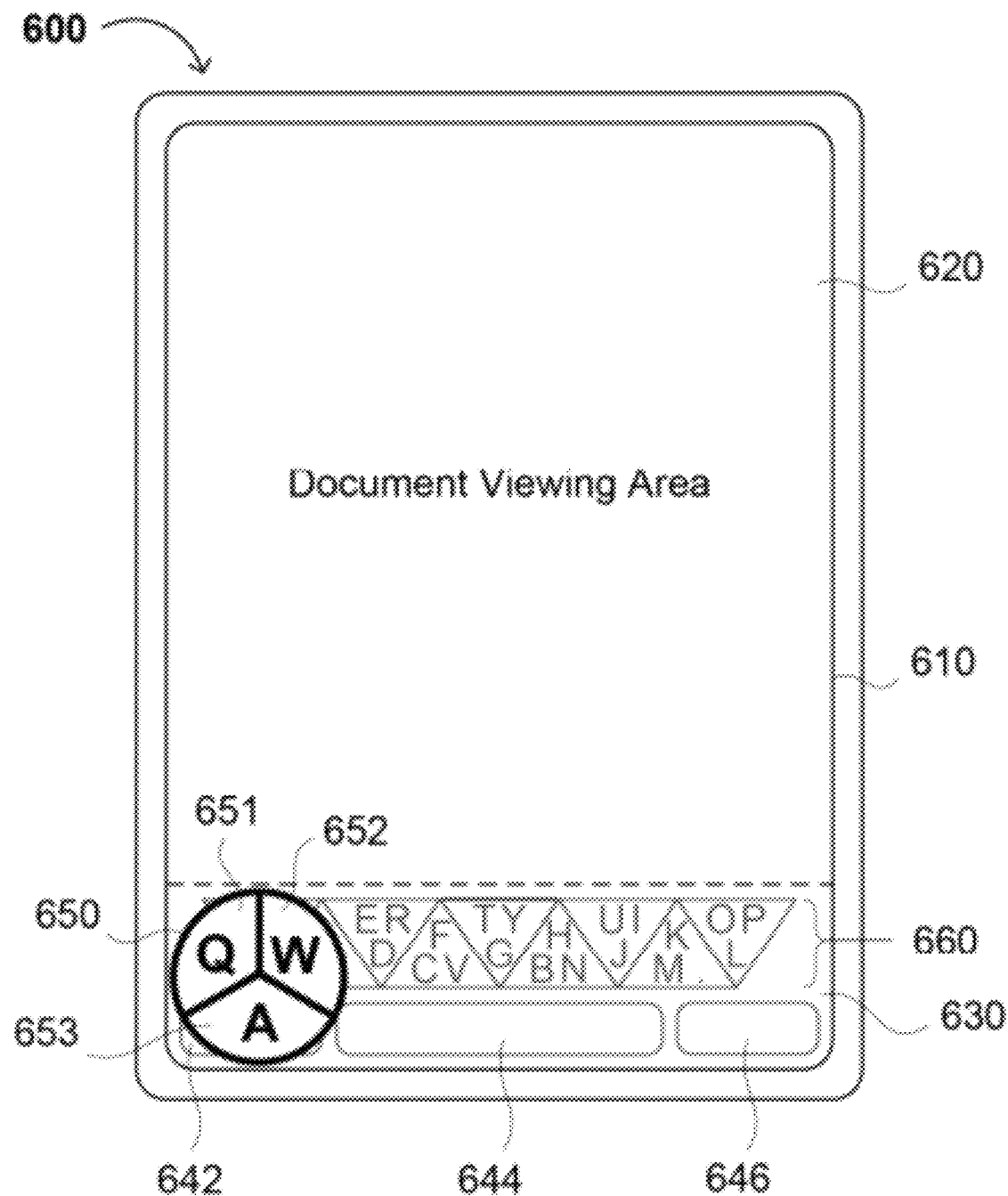
FIG. 6B is a diagram showing the touch sensitive display interface of FIG. 6A, including an embodiment of the second appearance of a selected virtual button.

FIG. 6B shows a second appearance 650 of the virtual button 611 in FIG. 6A. The second appearance 650 (FIG. 6B) is shown as an enlarged popup that is separated into different virtual keys 651, 652 and 653 for each character in the virtual button 611 in FIG. 6A and the second appearance 650 in FIG. 6B. The virtual key 651, 652 or 653 containing a desired character is then selected by an appropriate touching technique as discussed above. The second appearance 650 can be made smaller if it is necessary or desired to have a minimum touchable area of virtual key 642 visible and/or available for selection.

A Third Touch Sensitive Display

Figure 6C:
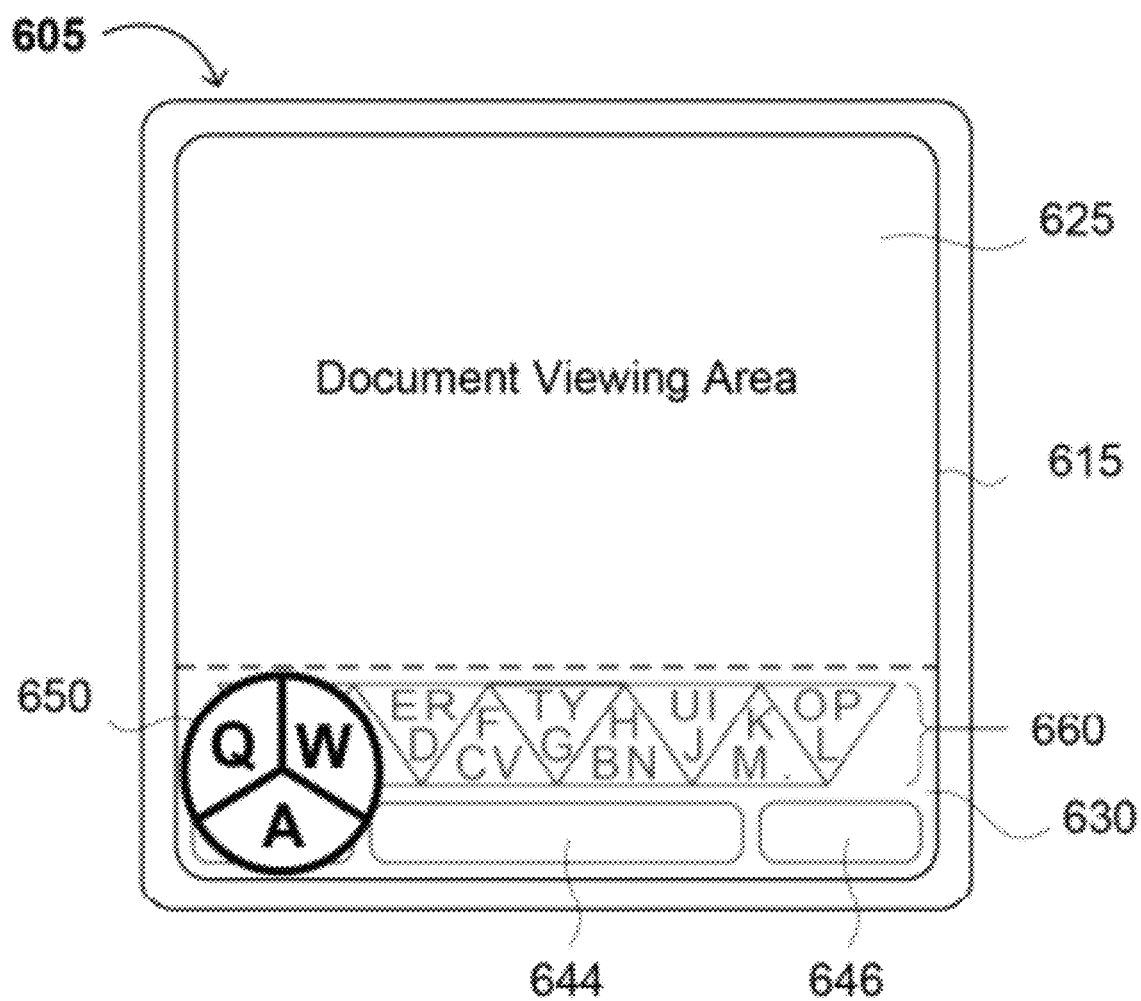
FIG. 6C is a diagram showing an embodiment of a reduced size touch sensitive display interface including an embodiment of the second appearance of a selected virtual button.

FIG. 6C shows a device 605 that has a vertically short or relatively square touch sensitive display 615, including a document viewing area 625 and virtual keyboard 630. The device 605 can include any portable electronic device and the viewing area 620 can show any displayable object discussed herein. The touch sensitive display 615 has a length-to-width ratio (or aspect ratio) of from about 1:1 to about 2:1 (e.g., from about 1.1:1 to about 1.5:1, or any other range of values therein). The touch sensitive display 615 can also have a length of from about 2 cm to about 15 cm (e.g., from about 4 cm to about 8 cm, or any other range of values therein) and/or a width of from about 2 cm to about 10 cm (e.g., from about 3 cm to 5 cm, or any other range of values therein). A second appearance of a virtual button 650 is shown as an enlarged pop-up in FIG. 6C. Since a single-row, triangle-shaped virtual button layout 660 is utilized, the vertically short touch sensitive display can accommodate a larger document viewing area, which can be particularly advantageous for devices having a small aspect ratio (e.g., device 605).

A Fourth Touch Sensitive Display

Figure 7:
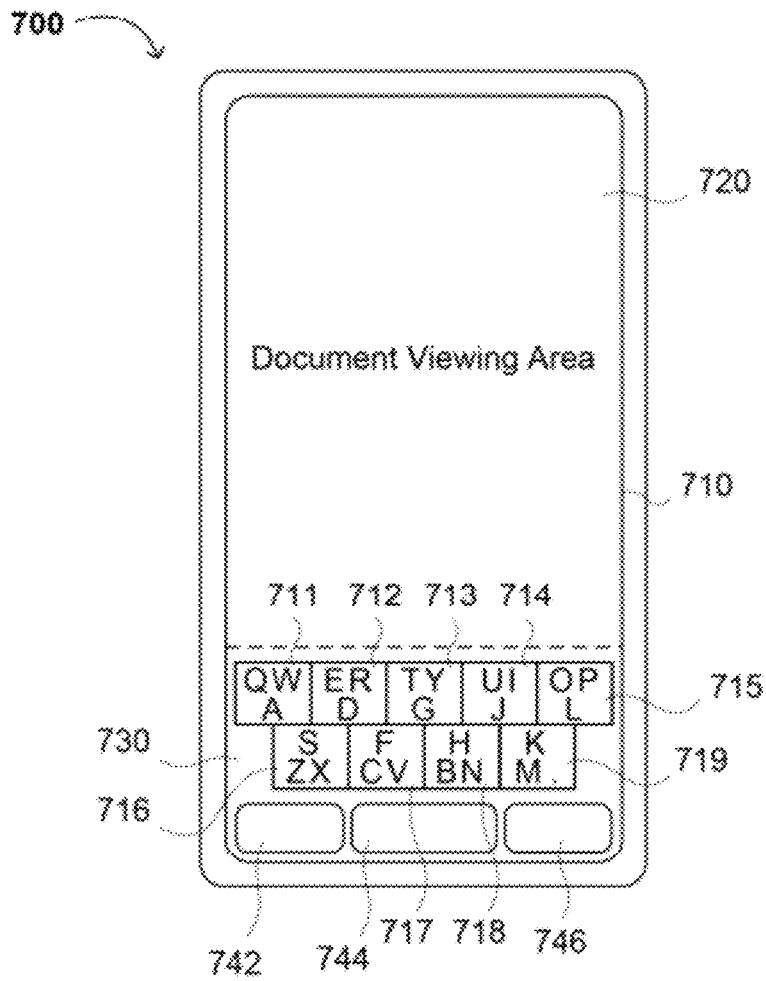
FIGS. 7-8 are diagrams showing embodiments of an interface for a touch sensitive display.

FIG. 7 shows a device 700 that has a touch sensitive display 710 which has a relatively narrow width compared to the device 605 in FIGS. 5A and 6C. The touch sensitive display 710 includes a viewing area 720 and a virtual keyboard 730. The virtual keyboard 730 includes virtual buttons 711-719 and virtual keys 742, 744, and 746. The virtual keys 742, 744, and 746 are similar to virtual keys 532, 534 and 536 in the device 500 of FIGS. 5A-5B and to virtual keys 642, 644, and 646 in the device 600 of FIGS. 6A-6C. The virtual buttons 711-719 are arranged in a two-row QWERTY keyboard layout such that each virtual button 711 through 719 contains a plurality of characters as described above.

The layout of the virtual buttons 711-719 within the virtual keyboard 730 allows the touch sensitive display 710 to be smaller (e.g., by width and/or height/length) than a conventional virtual keyboard layout for the same device. For example, a conventional virtual keyboard having a width equal to a sum of the minimum widths of each virtual key (see, e.g., the keys in virtual keyboard 10 of FIG. 1A or in virtual keyboard 25 of FIG. 1B) may not be displayable as a QWERTY type keyboard on the narrow (or high aspect ratio) touch sensitive display 710 as shown in FIG. 7. The ability to utilize the virtual keyboard 740 on a narrow device such as device 700 (e.g., having an aspect ratio of about 2:1 or higher) enables a broader application of virtual keyboards across touch sensitive devices.

Figure 8:
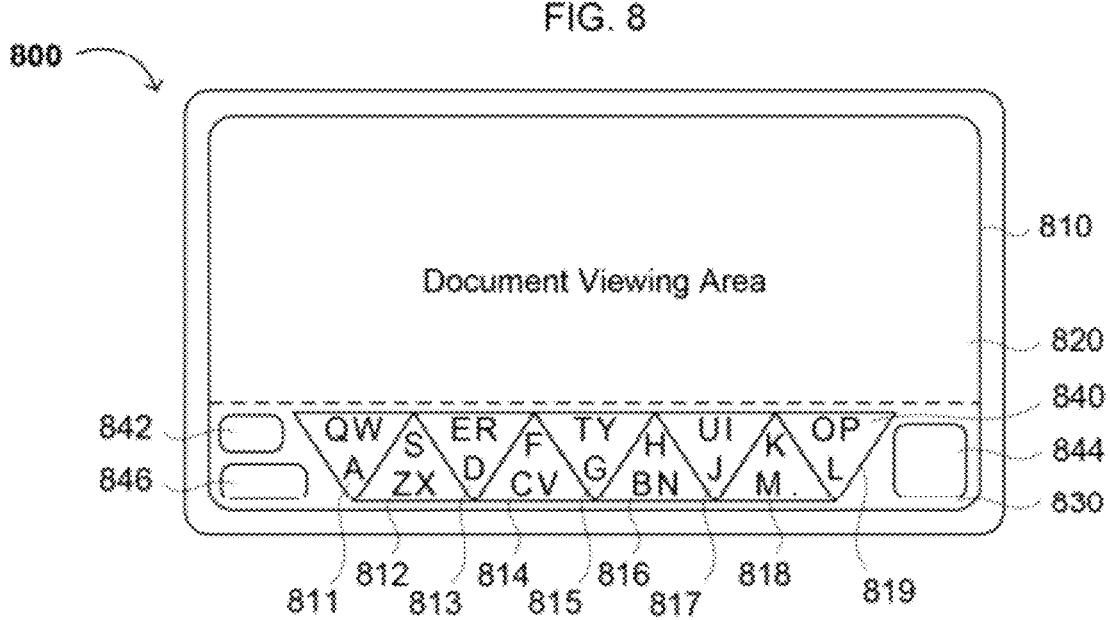

FIG. 8 shows a device 800 that has a touch sensitive display 810 having a relatively low aspect ratio (i.e., a width greater than its height), as compared to the devices 500, 600 and 605 in FIGS. 5A, 6A and 6C. The touch sensitive display 810 includes a viewing area 820 and a virtual keyboard 830. The virtual keyboard 830 includes virtual buttons 811-819 and virtual keys 842, 844, and 846. The virtual keys 842, 844, and 846 are similar to virtual keys 532, 534 and 536 in the device 500 of FIGS. 5A-5B and to virtual keys 642, 644, and 646 in the device 600 of FIGS. 6A-6C. The virtual buttons 811-819 have a triangular shape and are arranged in a single row, trapezoidal keyboard layout such that each virtual button 811 through 819 contains a plurality of characters as described above. The layout of the virtual buttons 811-819 within the virtual keyboard 830 allows the touch sensitive display 810 to be sized at a vertical height less than that of a conventional virtual keyboard layout. For example, the present layout can be used on a device having a widescreen display or an aspect ratio of less than 1:2.

FIGS. 7-8 can also be the same device having two different orientations. In a portrait orientation 700 (FIG. 7), the virtual buttons 711-719 of the virtual keyboard 730 are arranged in a two-row QWERTY keyboard layout as discussed above. When the device is rotated to a landscape position (FIG. 8), viewing area 820, virtual keyboard 830, and other keys 842, 844, and 846 in the rotated device 800 are adjusted to a landscape orientation. The virtual keyboard 830 occupies a relatively greater horizontal width and a relatively smaller vertical height of the touch sensitive display 810 (i.e., it has a lower aspect ratio). Utilizing two different virtual keyboards for a portrait and landscape orientations allows the areas of the virtual keyboards 730 and 830 to be minimized and the viewing areas 720 and 820 to be maximized. Further, utilizing keyboards 730 and 830 for respective portrait and landscape orientations generally reduces the area on the touch sensitive displays 710 and 810 occupied by the virtual keyboards 740 and 840 to an area smaller than the conventional devices 20, 100 and 105 of FIGS. 1B-1E, regardless of the orientation of the device 700.

A Fifth Touch Sensitive Display

Figure 9:
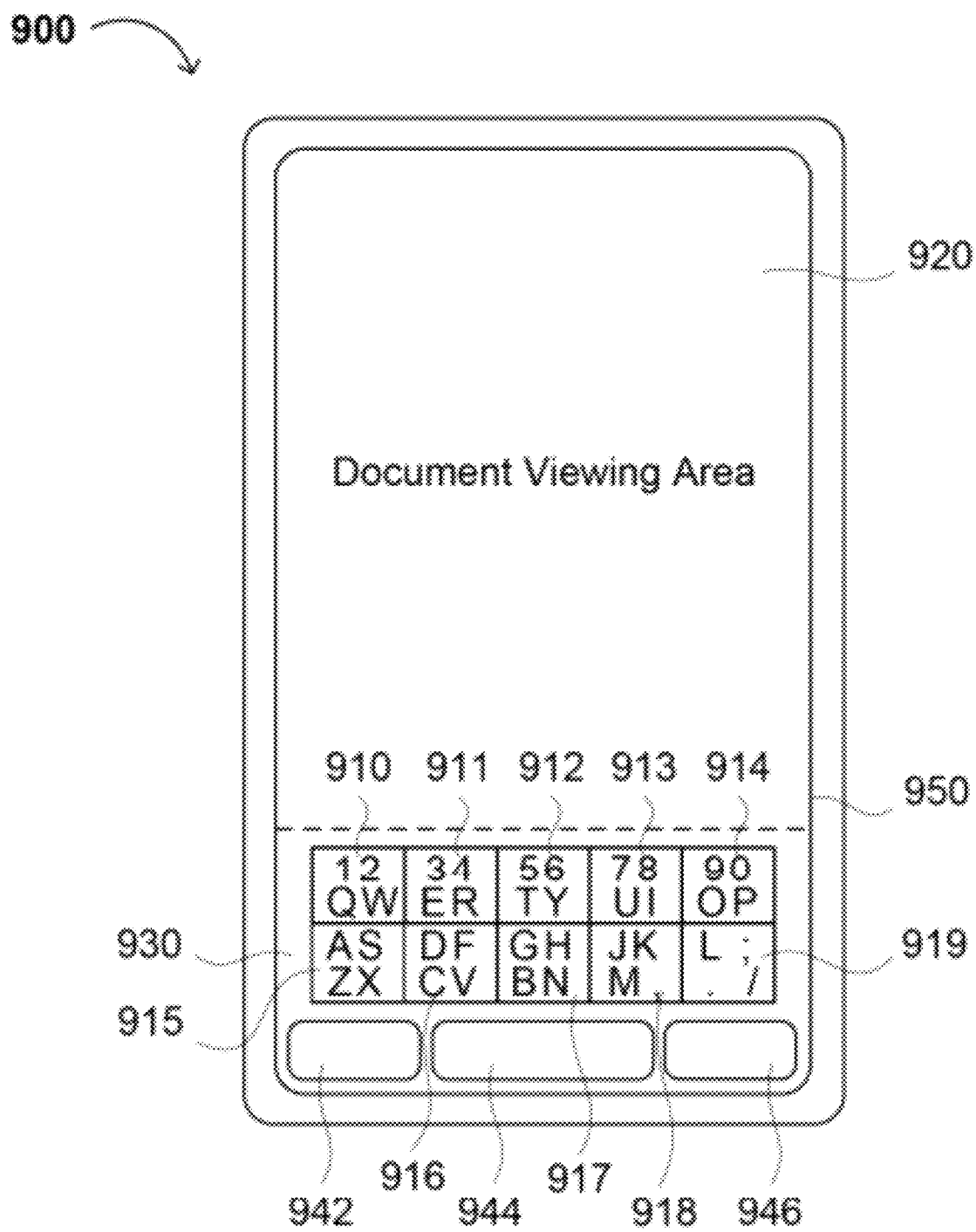
FIG. 9 is a diagram showing a further embodiment of a touch sensitive display having an alternative virtual keyboard.

FIG. 9 shows a device 900 that has a touch sensitive display 950 with a viewing area 920 and a virtual keyboard 930. The device 900 can have an aspect ratio similar to the device 700 of FIG. 7. The virtual keyboard 930 of FIG. 9 includes virtual buttons 910-919 and virtual keys 942, 944, and 946. The virtual keys 942, 944, and 946 are similar to virtual keys 532, 534 and 536 in the device 500 of FIGS. 5A-5B and to virtual keys 642, 644, and 646 in the device 600 of FIGS. 6A-6C. The virtual buttons 910-919 within the virtual keyboard 930 are arranged in a two row QWERTY layout, and each virtual button 910 through 919 contains four characters. Having four characters represented by each virtual button allows for additional characters (such as numerals 0-9) also to be displayed in the same space or area as the device 700 of FIG. 7. However, in the virtual buttons 910-919 of FIG. 9, numerals 0-9 can be replaced with other mathematical, punctuation, graphical and/or iconic characters as described above. Alternatively, the characters in the virtual buttons 910-919 can be grouped in a manner different from the QWERTY-like keyboard layout 930. For example, the alphabetic and numerical characters can be placed in the keyboard 903 sequentially with one virtual button dedicated to punctuation marks, or the alphabetic characters can be placed in the keyboard 903 sequentially with the remaining space in the virtual buttons 910-919 dedicated to punctuation marks and/or iconic or graphical characters, as discussed above.

Alternative Second Appearances of a Virtual Button

Figure 10:
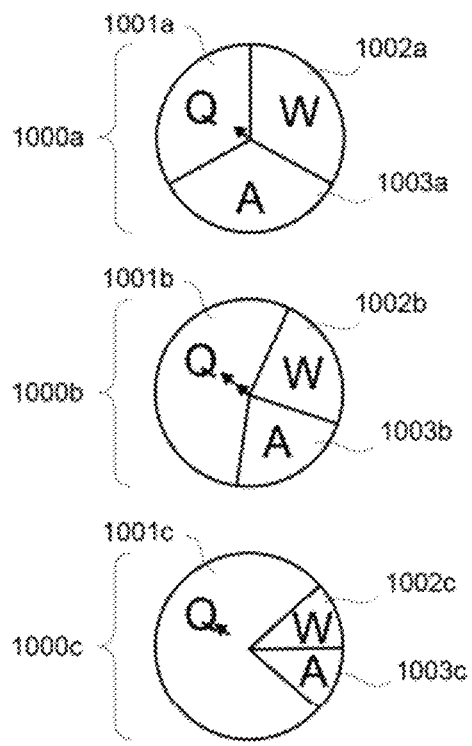
FIGS. 10-11 are diagrams showing various embodiments of second appearances of a virtual button, including various embodiments of virtual keys.
Figure 11:
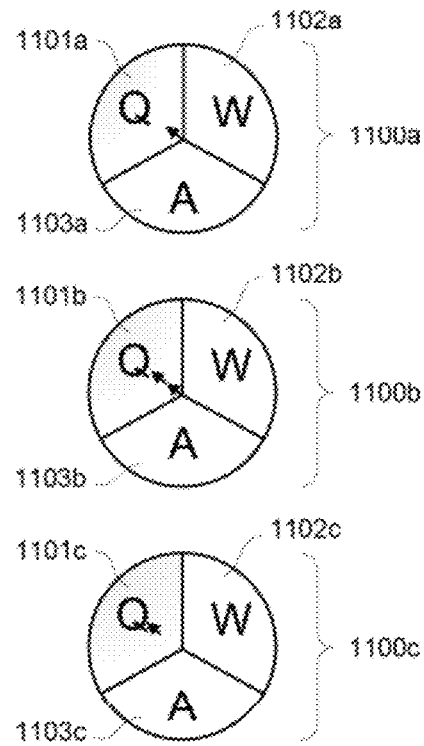

FIGS. 10-11 show various alternative second appearances of a selected virtual button. Referring to FIG. 10, the second appearance 1000*a* of a virtual button includes a plurality of virtual keys 1001*a*, 1002*a*, and 1003*a*, each containing a different character. The second appearance of 1000*a* of a virtual button maintains the second appearance as long as a touching instrument, such as a finger or stylus, is in continuous contact with the touch sensitive display. A user then selects one of the plurality of virtual keys containing a unique character, by sliding the touching instrument toward and/or on the desired virtual key 1001*a* as designated by an arrow within virtual key 1001*a*.

Visual and/or haptic feedback can be transmitted using the touch sensitive display to aide users in making an accurate and precise selection of a particular virtual key. For example, FIG. 10 shows visual feedback by modifying the second appearance 1000*a* of a virtual button such that moving the touching instrument toward virtual key 1001*a* expands virtual key 1001*a* and reduces the size of virtual keys 1002*a* and 1003*a*. Accordingly, as the finger or other touching instrument moves further away from a center of the second appearance, the selected virtual key area increases. For example, second appearances 1000*b* and 1000*c* show virtual key 1001*a* expanding to increased-size virtual keys 1001*b* and 1001*c*, and virtual keys 1002*a* and 1003*a* shrinking to smaller size virtual keys 1002*b*, 1003*b*, 1002*c*, and 1003*c*. This expansion of a selected area of the second appearance allows a user to receive feedback that they are selecting a particular virtual key (e.g., the virtual key 1001*a*-1001*c* containing the "Q" character).

FIG. 11 shows a second example of visual feedback by modifying a second appearance 1100*a* of a virtual button such that a background of virtual key 1101*a* changes as the touching instrument moves away from the center of the second appearance 1100*a* and toward virtual key 1101*a*. In FIG. 11, the background of virtual key 1101*a* in second appearances 1100*b* and 1100*c* have a color or color component (e.g., intensity, chrominance, luminance, shading, etc.) increased relative to that of virtual keys 1101*b* and 1101*c*. In one embodiment, the background of unselected virtual keys 1102*a* and 1103*a* remains unchanged, as shown by virtual keys 1102*b*, 1103*b*, 1102*c*, and 1103*c*. In another embodiment, the background of unselected virtual keys 1102*a* and 1103*a* changes (e.g., by darkening or fading), while that of the selected virtual key 1101*a* remains unchanged.

Another example of visual feedback includes a change in the size, font, and/or stylization (e.g., capitalization, italicization, boldness, etc.) of the character within the selected virtual key or within the unselected virtual key(s). For example, the character in the selected virtual key can increase in size and/or become italicized and/or bolder. Alternatively, the character in the unselected virtual key(s) can decrease in size and/or boldness, etc. Also, one example of haptic feedback includes a vibration occurring once a touching instrument moves far enough away from the center of the second appearance that a particular virtual key is selected.

Virtual Keyboard Control Logic

Figure 12:
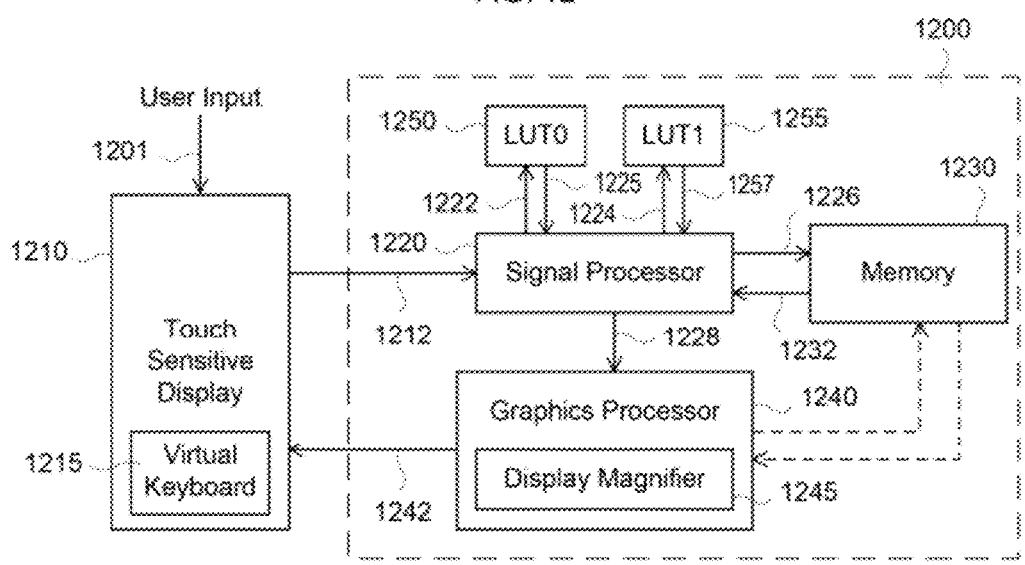
FIG. 12 is a block-level diagram showing an embodiment of circuitry configured to display various appearances of the virtual keyboard and virtual buttons on the present touch sensitive display interface.

FIG. 12 shows circuitry 1200 configured to control a virtual keyboard 1215 in a touch sensitive display 1210. Virtual keyboard 1215 can comprise, for example, any of the virtual keyboards 200, 201, 400 530, 630, 730, 830, or 930 in FIG. 2A, 3A, 4A, 5A-5B, 6A-6C, 7, 8, or 9. Also, touch sensitive display 1210 can comprise, for example, any of the displays 510, 610, 615, 710, 810, or 910 in FIG. 5A, 5B, 6A, 6B, 6C, 7, 8, or 9. Control circuit 1200 comprises a signal processor 1220, graphics processor 1240, memory 1230, and look up tables (LUTs) 1250 and 1255. In alternative embodiments, LUTs 1250 and 1255 can be replaced by a single LUT, or can be included within memory 1230. Also, memory 1230 can be a single memory array (e.g., embedded or discrete random access memory [RAM] or flash memory) or a plurality of separate memory arrays.

The signal processor receives an input signal on bus 1212 from the virtual keyboard 1215 in the touch sensitive display 1210 (which, in turn, receives a user input 1201). The input signal on bus 1212 can include information regarding the virtual button selected and/or its location on the virtual keyboard 1215. Signal processor 1220 then executes one or more instructions to retrieve information regarding the second appearance of the selected virtual button, or alternatively, to first identify the virtual button at the location on the virtual keyboard 1215 identified by the input signal, then retrieve information regarding the second appearance of the identified virtual button. The executed instruction can be transmitted on bus 1222 to first LUT 1250 or on bus 1226 to memory 1230. Either LUT 1250 or memory 1230 can store the information regarding the second appearance of the selected or identified virtual button. Alternatively, in one embodiment, LUT 1250 stores the locations in memory 1230 where the second appearance information is stored (e.g., regarding the shape, size, color, and/or characters in the second appearance of the [selected] virtual button[s]). Signal processor 1220 can then retrieve information from the first LUT 1250 over bus 1225 and transmit an address (and a read enable signal) to memory 1230 on bus 1226. Signal processor 1220 can then retrieve the second appearance information from memory 1230 on bus 1232. Alternatively, signal processor 1220 can retrieve second appearance information directly from the first LUT 1250 or memory 1230. Signal processor 1220 can also write data to and/or fetch instructions from memory 1230. Signal processor 1220 then outputs second appearance information on bus 1228 to graphics processor 1240 (which can alter the information using a display magnifier 1245). Graphics processor 1240 then provides graphic data to the touch sensitive display 1210 on bus 1242 to display the second appearance of the selected virtual button. Alternatively or additionally, graphics processor 1240 can retrieve instructions and/or data from memory 1230. Optionally, graphics processor 1240 can store data in memory 1230, temporarily or relatively permanently.

A second input signal that is transmitted from touch sensitive display 1210 on bus 1212 to signal processor 1220 can include information regarding the virtual key selected and/or its location on the virtual keyboard 1215. Signal processor 1220 then executes one or more instructions to retrieve information regarding the character which corresponds to a selected virtual key from second LUT 1255 (which can store the character information or the locations in memory 1230 where the character information for the selected virtual key is stored) or from memory 1230. Signal processor 1220 can then retrieve information from the second LUT 1255 on bus 1257, for example to transmit an address on bus 1226 to memory 1230. Signal processor 1220 can then retrieve character information from memory 1230 on bus 1232. Alternatively, signal processor 1220 can retrieve character information directly from the second LUT 1255 or memory 1230. Signal processor 1220 can then output the character information on bus 1228 to graphics processor 1240, and then provide graphic data to the touch sensitive display 1210 on bus 1242 to enter the character into a viewing area or viewing field of the touch sensitive display 1210, or to execute a function or macro represented by the selected character, etc.

First LUT 1250 and second LUT 1255 can be a volatile memory, such as random access memory (e.g., a register or relatively small block of RAM), and the data to be stored in first and second LUTs 1250 and 1255 can be backed up by a non-volatile memory (e.g., a block of flash memory, a group of EPROM configuration bits, etc.). Also, memory 1230 can comprise a volatile memory, such as random access memory (RAM), or non-volatile memory, such as a hard disk drive, a solid-state drive, embedded flash memory, or other non-volatile memory. It is well within the abilities of one skilled in the art to design and use logic configured to control the present interface.

A Method of Using the Interface

Figure 13:
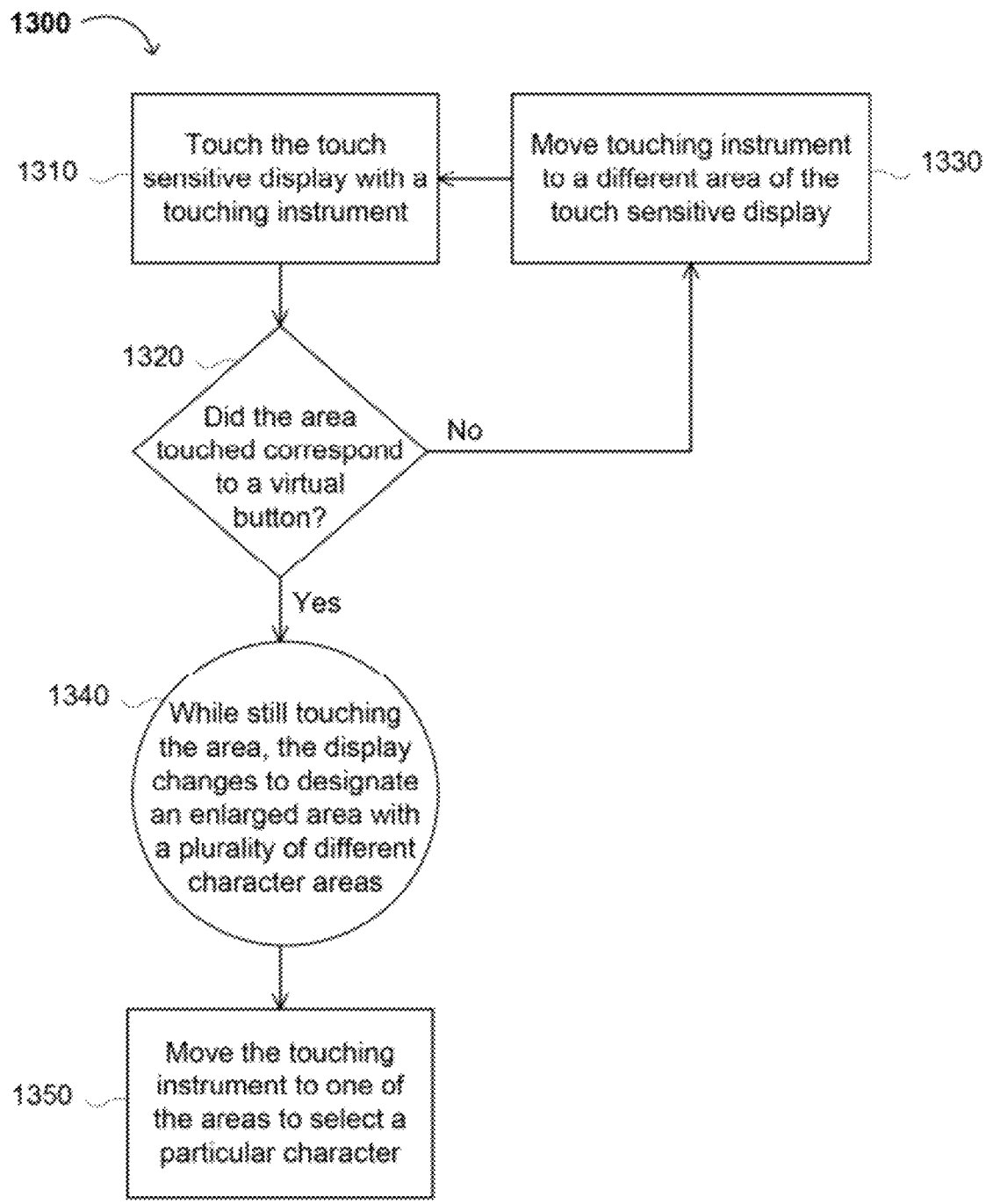
FIG. 13 is a flow chart showing a method of selecting a virtual button and a virtual key using the present touch sensitive display interface.

FIG. 13 shows a flow diagram 1300 for a method of operating an interface of a device having a touch sensitive display that has a virtual keyboard thereon, as described herein. At 1310, the touch sensitive display is touched by a touching instrument (e.g., a finger, stylus or other instrument described herein) to select a virtual button. At 1320, logic in the device determines whether the touched area of the touch sensitive display corresponds to a virtual button. If not, or if the area corresponds to more than one virtual button, then at 1330, the touching instrument is moved to a different area of the touch sensitive display. At this point, the touch sensitive display is touched again (at 1310). If the touched area is a virtual button, then at 1340, the display is changed to show an enlarged area with a plurality of different virtual keys, as described herein. In one embodiment, the enlarged area appears while the touching instrument still touches the original touched area. Alternatively, the enlarged area can appear after the touching instrument is removed from the original touched area. The display can change to show any embodiment of a second appearance of a virtual button as described above, or any other second appearance coming within the scope of the present disclosure. At 1350, the touching instrument is moved to one of the virtual keys in the second appearance to select a particular character. The virtual keys can be situated according to any of the above described embodiments. Further, the character can be any character described above.

A Method of Designing the Interface

FIG. 14 is a flow diagram showing a method 1400 of designing a touch sensitive interface having the present virtual keyboard thereon and/or therein. At 1410, a list of keyboard functions is created, where each function corresponds to a different user input. The keyboard functions can comprise any functions described herein, but generally will include at least those functions relating to selecting a virtual button and selecting a virtual key from the second appearance of the selected virtual button to enter a particular character, symbol or icon into a predefined field in the viewing area of the touch sensitive display. At 1420, a viewing area (e.g., a document viewing area) and a keyboard area are defined on the touch sensitive display. At 1430, a plurality of areas within the keyboard area are defined to each have a different graphical view and each correspond to a different subset of characters and/or function(s). At 1440, a user input from the keyboard area (e.g., touching a particular location on the keyboard) is correlated to a particular keyboard function, and execution of the function is enabled (e.g., by defining one or more software instructions that execute the function). At 1450, a graphical view is designated to correspond to the executed function of the user input. For example, predetermined graphical data can be stored in memory so that the graphical data can be displayed on the touch sensitive display upon selection of a particular virtual key by the user.

Software

The present invention also includes algorithms, computer program(s) and/or software, implementable and/or executable in a general purpose computer or workstation equipped with a conventional digital signal processor, configured to perform one or more steps of the method and/or one or more operations of the hardware. Thus, a further aspect of the disclosure relates to algorithms and/or software that implement the above method(s). For example, the invention can further relate to a computer program, computer-readable medium or waveform containing a set of instructions which, when executed by an appropriate processing device (e.g., a signal processing device, such as a microcontroller, microprocessor or DSP device), is configured to perform the above-described method and/or algorithm.

For example, the computer program can be on any kind of readable medium, and the computer-readable medium can comprise any medium that can be read by a processing device configured to read the medium and execute code stored thereon or therein, such as a floppy disk, CD-ROM, magnetic tape or hard disk drive. Such code can comprise object code, source code and/or binary code.

The waveform is generally configured for transmission through an appropriate medium, such as copper wire, a conventional twisted pair wireline, a conventional network cable, a conventional optical data transmission cable, or even air or a vacuum (e.g., outer space) for wireless signal transmissions. The waveform and/or code for implementing the present method(s) are generally digital, and are generally configured for processing by a conventional digital data processor (e.g., a microprocessor, microcontroller, or logic circuit such as a programmable gate array, programmable logic circuit/device or application-specific [integrated] circuit).

The present interface also includes a computer readable set of instructions stored in a memory operably coupled to the logic. The computer readable set of instructions can define the location and/or function of the virtual keyboard area, virtual buttons, and how the logic controls the touch sensitive display. Controlling the touch sensitive display can further include modifying the display according to a user controlled input.

CONCLUSION/SUMMARY

Thus, embodiments of the present disclosure provide an interface, circuit, architecture, system and method for a touch sensitive display. The interface generally includes a touch sensitive display having a virtual keyboard area and a viewing area. The virtual keyboard area has a plurality of virtual buttons. Each of the virtual buttons has a first appearance and includes a plurality of alphanumeric, graphical, and/or iconic characters. The virtual keyboard also includes logic configured to receive an input from the touch sensitive display in response to a virtual button being selected, and send an output to instruct the touch sensitive display to display a second appearance of the selected virtual button.

The foregoing descriptions of embodiments of the present disclosure have been presented for purposes of illustration and description. They are not intended to be exhaustive or to limit the disclosure to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A user interface comprising:
a touch screen display having i) a virtual keyboard area and ii) a viewing area, the virtual keyboard area comprising a plurality of virtual buttons, wherein each virtual button has a plurality of alphanumeric, graphical, and/or iconic characters displayed in accordance with a first appearance; and
logic configured to
receive a first input from the touch screen display in response to a virtual button being selected by a touching instrument,
in response to the first input, instruct the touch screen display to alter the first appearance of the plurality of alphanumeric, graphical, and/or iconic characters of the selected virtual button as displayed in the virtual keyboard area so that the plurality of alphanumeric, graphical, and/or iconic characters of the selected virtual button are displayed in accordance with a second appearance, and
receive a second input from the touch screen display in response to the touch instrument selecting a first character of the plurality of alphanumeric, graphical, and/or iconic characters of the selected virtual button, wherein the first character is selected by the touching instrument sliding over the touch screen display in a manner away from a center area of the plurality of alphanumeric, graphical, and/or iconic characters of the selected virtual button as displayed in accordance with the second appearance and in a direction corresponding to the first character;
wherein sliding the touching instrument in the direction corresponding to the first character provides visual feedback to a user indicating that the first character will be selected, the visual feedback comprising an enlargement of a first area of the second appearance and a shrinking of a second area of the second appearance, and wherein an amount of enlargement and an amount of shrinking is based on a distance that the touching instrument is slid away from the center area of the second appearance.

2. The interface of claim 1, wherein the first appearance of each of the virtual buttons comprises a first polygonal shape, a first circular shape, or a first elliptical shape.

3. The interface of claim 2, wherein the second appearance of each of the virtual buttons comprises a second polygonal shape, a second circular shape, or a second elliptical shape.

4. The interface of claim 1, wherein the second appearance of the virtual button has a button size larger than the first appearance.

5. The interface of claim 1, wherein the second appearance of the virtual button contains characters having a character size larger than non-selected characters and/or corresponding characters in the first appearance.

6. The interface of claim 1, wherein each of the virtual buttons includes a group of two or more of the alphanumeric, iconic, and/or graphical characters.

7. The interface of claim 1, wherein the touch screen display comprises a sensor operably coupled to the logic.

8. The interface of claim 1, wherein the touch screen display has a first virtual keyboard area in a first orientation of the touch screen display, and a second virtual keyboard area in a second orientation of the touch screen display.

9. A user interface comprising:
a touch screen display having i) a virtual keyboard area and ii) a viewing area, the virtual keyboard area comprising a plurality of virtual buttons, wherein each virtual button has a plurality of alphanumeric, graphical, and/or iconic characters displayed in accordance with a first appearance; and
logic configured to
receive a first input from the touch screen display in response to a virtual button being selected by a touching instrument,
in response to the first input, instruct the touch screen display to alter the first appearance of the plurality of alphanumeric, graphical, and/or iconic characters of the selected virtual button as displayed in the virtual keyboard area so that the plurality of alphanumeric, graphical, and/or iconic characters of the selected virtual button are displayed in accordance with a second appearance, and receive a second input from the touch screen display in response to the touch instrument selecting a first character of the plurality of alphanumeric, graphical, and/or iconic characters of the selected virtual button, wherein the first character is selected by the touching instrument sliding over the touch screen display in a manner away from a center area of the plurality of alphanumeric, graphical, and/or iconic characters of the selected virtual button as displayed in accordance with the second appearance and in a direction corresponding to the first character;

wherein sliding the touching instrument in the direction corresponding to the first character provides visual feedback to a user indicating that the first character will be selected, the visual feedback comprising a changing of a background color of an area of the second appearance, and wherein an amount of the changing of the background color is based on a distance that the touching instrument is slid away from the center area of the second appearance.

10. A user interface comprising:

a touch screen display having i) a virtual keyboard area and ii) a viewing area, the virtual keyboard area comprising a plurality of virtual buttons, wherein each virtual button has a plurality of alphanumeric, graphical, and/or iconic characters displayed in accordance with a first appearance; and logic configured to receive a first input from the touch screen display in response to a virtual button being selected by a touching instrument, in response to the first input, instruct the touch screen display to alter the first appearance of the plurality of alphanumeric, graphical, and/or iconic characters of the selected virtual button as displayed in the virtual keyboard area so that the plurality of alphanumeric, graphical, and/or iconic characters of the selected virtual button are displayed in accordance with a second appearance, and receive a second input from the touch screen display in response to the touch instrument selecting a first character of the plurality of alphanumeric, graphical, and/or iconic characters of the selected virtual button, wherein the first character is selected by the touching instrument sliding over the touch screen display in a manner away from a center area of the plurality of alphanumeric, graphical, and/or iconic characters of the selected virtual button as displayed in accordance with the second appearance and in a direction corresponding to the first character;

wherein sliding the touching instrument in the direction corresponding to the first character provides visual feedback to a user indicating that the first character will be selected, the visual feedback comprising a change in a size, a font, or a stylization of a character of the second appearance, and wherein an amount of the change in the size, the font, or the stylization is based on a distance that the touching instrument is slid away from the center area of the second appearance.

11. The interface of claim 10, wherein the change in the stylization is a capitalization, an italicization, or a bolding.

12. The interface of claim 1, wherein sliding the touching instrument in the direction corresponding to the first character provides haptic feedback to a user indicating that the first character will be selected.

13. The interface of claim 12, wherein the haptic feedback is a vibration that occurs as the touching instrument is slid away from the center area of the second appearance.

14. The interface of claim 13, wherein an amount of the vibration is based on a distance that the touching instrument is slid away from the center area of the second appearance.

* * * * *